United States Patent
Danner et al.

(10) Patent No.: US 6,556,663 B2
(45) Date of Patent: Apr. 29, 2003

(54) GUESTROOM TELEPHONE HAVING SINGLE ACTION MESSAGE RETRIEVAL

(75) Inventors: Gregory J. Danner, Urbana, IL (US); Bing N. Sun, Champaign, IL (US)

(73) Assignee: Scitec, Inc., Urbana, IL (US)

(*) Notice: Subject to any disclaimer, the term of this patent is extended or adjusted under 35 U.S.C. 154(b) by 0 days.

(21) Appl. No.: 09/977,580

(22) Filed: Oct. 15, 2001

(65) Prior Publication Data

US 2002/0065051 A1 May 30, 2002

Related U.S. Application Data

(60) Provisional application No. 60/240,726, filed on Oct. 16, 2000, and provisional application No. 60/240,779, filed on Oct. 16, 2000.

(51) Int. Cl.$^7$ .......................... H04M 1/64; H04M 1/66; H04M 7/00
(52) U.S. Cl. ................. 379/67.1; 379/88.08; 379/88.11; 379/88.12; 379/88.22; 379/198; 379/227
(58) Field of Search ................... 379/67.1, 70, 76, 379/88.04, 88.08, 88.11, 88.12, 88.13, 88.19, 88.22, 167.01, 198, 207.06, 225, 226, 227, 232, 265.02, 387.01, 388.01

(56) References Cited

U.S. PATENT DOCUMENTS

| | | | |
|---|---|---|---|
| 3,532,832 A | 10/1970 | Hestad et al. | 379/263 |
| 4,438,506 A | 3/1984 | Strom | 364/900 |
| 4,506,115 A | 3/1985 | Schmitt | 179/84 |
| 4,612,416 A | 9/1986 | Emerson et al. | 179/6.11 |
| 4,648,109 A | 3/1987 | Boeckmann | 379/376 |
| 4,726,060 A | 2/1988 | Itoh et al. | 379/376 |
| 4,853,952 A | 8/1989 | Jachmann et al. | 379/88 |
| 5,280,523 A | 1/1994 | Lee | 379/376 |
| 5,384,832 A | 1/1995 | Zimmerman et al. | 379/67 |
| 5,400,393 A * | 3/1995 | Knuth et al. | 379/88 |
| 5,612,995 A | 3/1997 | Corwith | 379/377 |
| 5,664,008 A | 9/1997 | Bossi et al. | 379/67 |
| 5,768,366 A | 6/1998 | Jauregui et al. | 379/396 |
| 5,802,147 A | 9/1998 | Beyda et al. | 379/67 |
| 5,802,166 A | 9/1998 | Garcia et al. | 379/372 |
| 5,825,852 A | 10/1998 | DePond et al. | 379/67 |
| 5,940,408 A | 8/1999 | Zitting | 370/523 |
| 5,946,386 A * | 8/1999 | Rogers et al. | 379/265 |
| 5,987,317 A | 11/1999 | Venturini | 455/412 |
| 6,208,731 B1 | 3/2001 | DePond et al. | 379/67 |
| 6,405,032 B1 | 6/2002 | Buhrmann | 455/413 |
| 6,453,018 B2 | 9/2002 | Henry et al. | 379/67.1 |
| 2002/0001302 A1 * | 1/2002 | Pickett | 370/352 |

* cited by examiner

*Primary Examiner*—Allan Hoosain
(74) *Attorney, Agent, or Firm*—Welsh & Katz, Ltd.; Eric D. Cohen

(57) ABSTRACT

A telephone system is operatively coupled to a private automatic branch exchange (PABX) system and to a voice mail system, where the telephone system permits a user to retrieve recorded voice messages from the voice mail system. The telephone system includes one or more telephones, where each telephone further includes a handset, a message waiting indicator configured to inform the user that the voice message is pending with the voice mail system, a message retrieval key for retrieving the voice message from the voice mail system, and an audio speaker configured to provide the user with audio output corresponding to the voice message. A single action by the user of activating the message retrieval key causes the voice message to be retrieved and the audio speaker to be automatically activated such that the voice message is output on the audio speaker without the user lifting the handset.

15 Claims, 18 Drawing Sheets

GUESTROOM TELEPHONE HAVING SINGLE ACTION MESSAGE RETRIEVAL

CROSS-REFERENCE TO RELATED APPLICATIONS

This application claims the benefit of priority from provisional application Ser. No. 60/240,726, filed Oct. 16, 2000, entitled Remote Speed-dial Key Programming System For Guestroom Telephones, and also claims the benefit of priority from provisional application Ser. No. 60/240,779, filed Oct. 16, 2000, entitled Guestroom Telephone Having One-Touch Message Retrieval System. Provisional application Ser. No. 60/240,726, filed Oct. 16, 2000 and Provisional application Ser. No. 60/240,779, filed Oct. 16, 2000 are incorporated herein by reference in their entirety. This application is also related to Design Pat. No. D448,011 issued Sep. 18, 2001, which is hereby incorporated by reference in its entirety.

FIELD OF THE INVENTION

The present invention relates generally to a telephones having message retrieval capability and more specifically to guestroom telephones that facilitate retrieval of stored messages by a single action by the user.

BACKGROUND OF THE INVENTION

It is well know that telephone systems may be connected to voice mail systems so that voice mail messages may be retrieved by the user. Often, the voice mail systems are associated with private automatic branch exchanges (PABX). This is often the case in commercial environments, such as in offices, industrial environments, and the hospitality environments, such as in hotels and the like.

In many residential applications, voice mail services are typically offered by the telephone service provider or PSTN (Public Switched Telephone Network) or equivalent. To retrieve messages via the residential telephone, the user may dial the central telephone number or access number of the voice mail system, and upon receipt of a prompt, the user then enters the residential telephone number to identify a particular "mail box." Entry of a password is also typically required. The message is then played back. Alternatively, if the user is calling from the residential telephone corresponding to the mail box number (i.e., typically the user's home telephone), the user may dial "*98," which in some systems, retrieves the messages.

It is also known that telephones may include a speakerphone, which permits the user to listen to the audio output without placing the handset next to the ear. The speakerphone is typically activated by depressing a specific "speakerphone" button or "speaker" key. Once the speaker function is activated, the user may use the keys to dial a telephone number, and will hear the DTMF (dual tone multi-frequency) tones through the speaker. All voice communication will also be heard through the speaker.

Retrieval of voice mail messages in commercial, industrial and hospitality environments may be slightly less complex than retrieval of messages in the residential environment because telephones in such environments may include one button or key that automatically causes the telephone to connect with the corresponding PABX system. Thus, the user may lift the handset and depress the appropriate message retrieval key to retrieve the stored messages.

Although the above methods and systems permit the user to retrieve voice mail messages, such systems are somewhat inconvenient because the user must perform several actions before the voice mail message can be retrieved. As described above, in a residential telephone system, the user must lift the handset and then dial the correct telephone (along with the correct access code and password) to retrieve the messages. However, at least several actions are required, that is, the user must either lift the handset, and then contact the voice mail system. Accordingly, at least two or more separate actions are required.

Similarly, in some commercial environments, the user may also lift the handset and then dial the correct telephone to connect to the voice mail system. Often, once the user has lifted the handset, he or she may depress an additional button to connect to the voice mail system to retrieve the messages. The second button is often a "speed-dial" button, which causes automatic dialing of the correct sequence of numbers to effect connection and retrieval of the stored voice mail messages. At least two actions are required, that is, the user must either lift the handset, and then must depress a second key (speed-dial key) to contact the voice mail system and retrieve the messages, which are played back. Again, the above described method requires at least two separate actions by the user. It is therefore desirable to provide a telephone system that permits a user to retrieve voice mail messages via a single user action.

As described above, telephones systems in commercial environments, such as in offices, industrial environments, and the hospitality environments, such as in hotels, and the like, are usually connected to voice mail systems associated with private automatic branch exchanges (PABX). However, depending upon the age of the equipment, such PABX systems may utilize different technology for issuing the message waiting signal. If a hotel updates its PABX equipment, often all of the telephones must be replaced to maintain compatibility with the message waiting signal. This can be very expensive. It is therefore desirable to have a telephone that responds to a variety of message waiting signals sent from a PABX.

SUMMARY OF THE INVENTION

The disadvantages of present telephone systems are substantially overcome with the present invention by providing a novel guestroom telephone that permits a user to retrieve stored voice mail messages through a signal action, namely, depressing a single button or key. The user need not lift the handset.

Known guestroom telephone systems require the user to perform several actions to retrieve stored voice mail messages. The present invention permits the user to retrieve voice mail messages though one action and only one action, that is, by depressing a single button or key. Upon depression of the "message retrieval" key, the telephone sends the correct sequence of DTMF tones to the PABX. This causes the PABX to retrieve and playback the stored messages corresponding to the particular hotel room. Simultaneously, the speaker portion of the telephone is activated to that the message is heard through the speaker. The user need not pick up the handset and then depress a message retrieval key. It is much more convenient that the user can depress only a single button to perform the desired task, rather than depressing two or more buttons.

More specifically, a telephone system according to one embodiment of the present invention is operatively coupled to a private automatic branch exchange (PABX) system and to a voice mail system, where the telephone system permits a user to retrieve recorded voice messages from the voice mail system. The telephone system includes one or more telephones, where each telephone further includes a handset, a message waiting indicator configured to inform the user that the voice message is pending with the voice mail system, a message retrieval key for retrieving the voice message from the voice mail system, and an audio speaker configured to provide the user with audio output corresponding to the voice message. A single action by the user of activating the message retrieval key causes the voice message to be retrieved and the audio speaker to be automatically activated such that the voice message is output on the audio speaker without the user lifting the handset.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

DETAILED DESCRIPTION OF THE INVENTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

It is to be further understood that the title of this section of the specification, namely, "Detailed Description of the Invention" relates to Rules of the U.S. Patent and Trademark Office, and is not intended to, does not imply, nor should be inferred to limit the subject matter disclosed herein or the scope of the invention.

Figure 1:
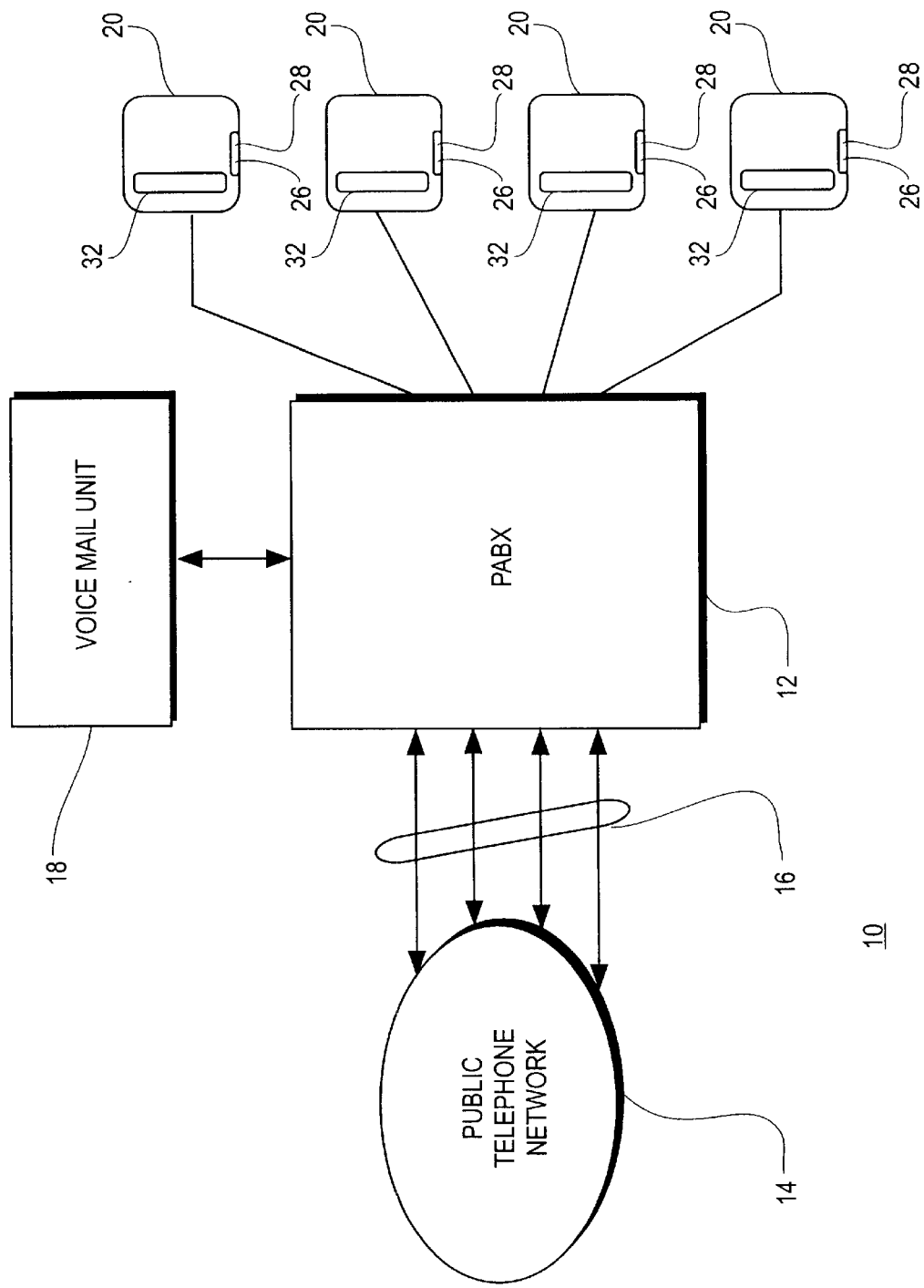
FIG. 1 is a block diagram of a specific embodiment of a telephone system, according to the present invention.

Referring now to FIG. 1, a telephone system 10 is shown generally. The telephone system 10 includes a private automatic branch exchange (PABX or PABX) 12 connected to an external telephone network or public switched telephone network (PSTN) 14 by a plurality of trunk lines 16. The PABX 12 preferably includes a voice mail system 18 for recording, saving and playing back voice messages. One or more guestroom telephones 20 are coupled to the PABX 12. Each guestroom telephone 20 includes a message waiting light 26 and a message retrieval touch bar 28. The telephone system 10 is configured to be operatively coupled to the private automatic branch exchange 12 and to the voice mail system 18, where the voice mail system 18 permits the user to retrieve the recorded voice messages.

In one specific embodiment, the telephones may be guestroom telephones 20 corresponding to the telephone(s) in each room of a hospitality-based establishment, such as in a hotel. Multiple guestroom telephones 20 may exist in each room, and may have the same telephone number (extensions), or may have different telephone numbers. Of course, the present invention may be implemented in other environments, such as in commercial establishments, such as in offices, and in industrial environments, such as in factories. For purposes of illustration only, the telephones shall be referred to as guestroom telephones 20, but may, for example, represent a plurality of telephones in a factory. Accordingly, the present invention is not limited to a specific environment as described herein.

As is known in the art, the PABX 12 may include the voice mail system 18. Typically, when a caller places a call to the user's telephone, and the user does not answer the telephone within certain number of rings, if activated, the voice mail system 18 will intercept the call. The voice mail system 18 typically issues a greeting to the caller, which greeting may have been pre-recorded by the user, or may be a system message or generic message generated by the voice mail system 18. After the greeting is played, the caller is given an opportunity to leave a message, which is then recorded. After the caller leaves the message, the PABX 12 causes the message waiting light to be activated on the guestroom telephone 20 to inform the user that a voice mail message is pending. When a message has been stored in a "voice mailbox" for the guest, one or more lights or the message waiting indicators 26 located under the message retrieval bar 28 begin to blink, visually signaling the user that a message for that particular guestroom has been received. To retrieve the stored messages, the hotel guest need only lightly depress the message retrieval touch bar 28, as is described in greater detail below.

Figure 2:
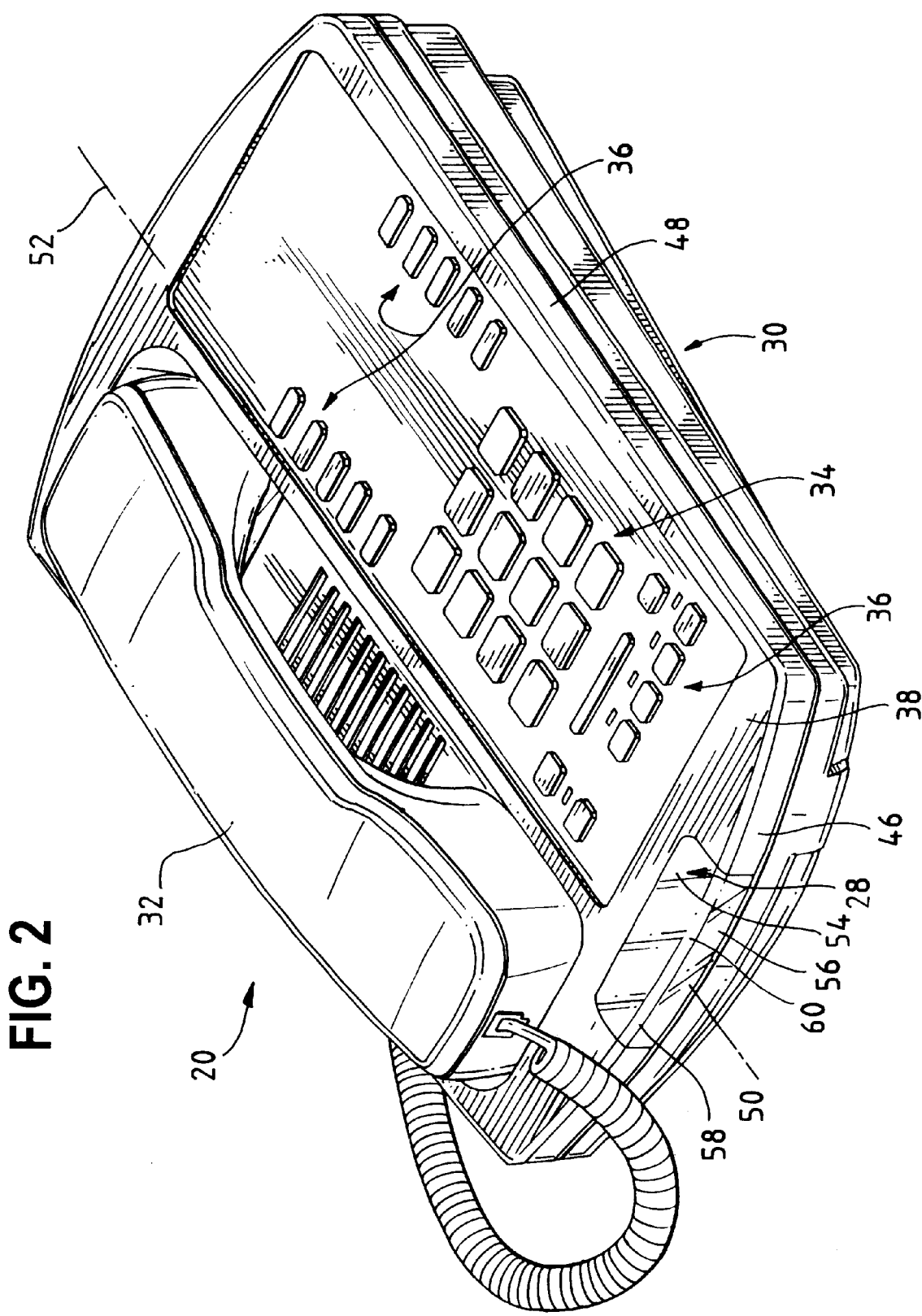
FIG. 2 is a perspective view of a specific embodiment of a guestroom telephone particularly illustrating the message waiting touch bar.
Figure 3:
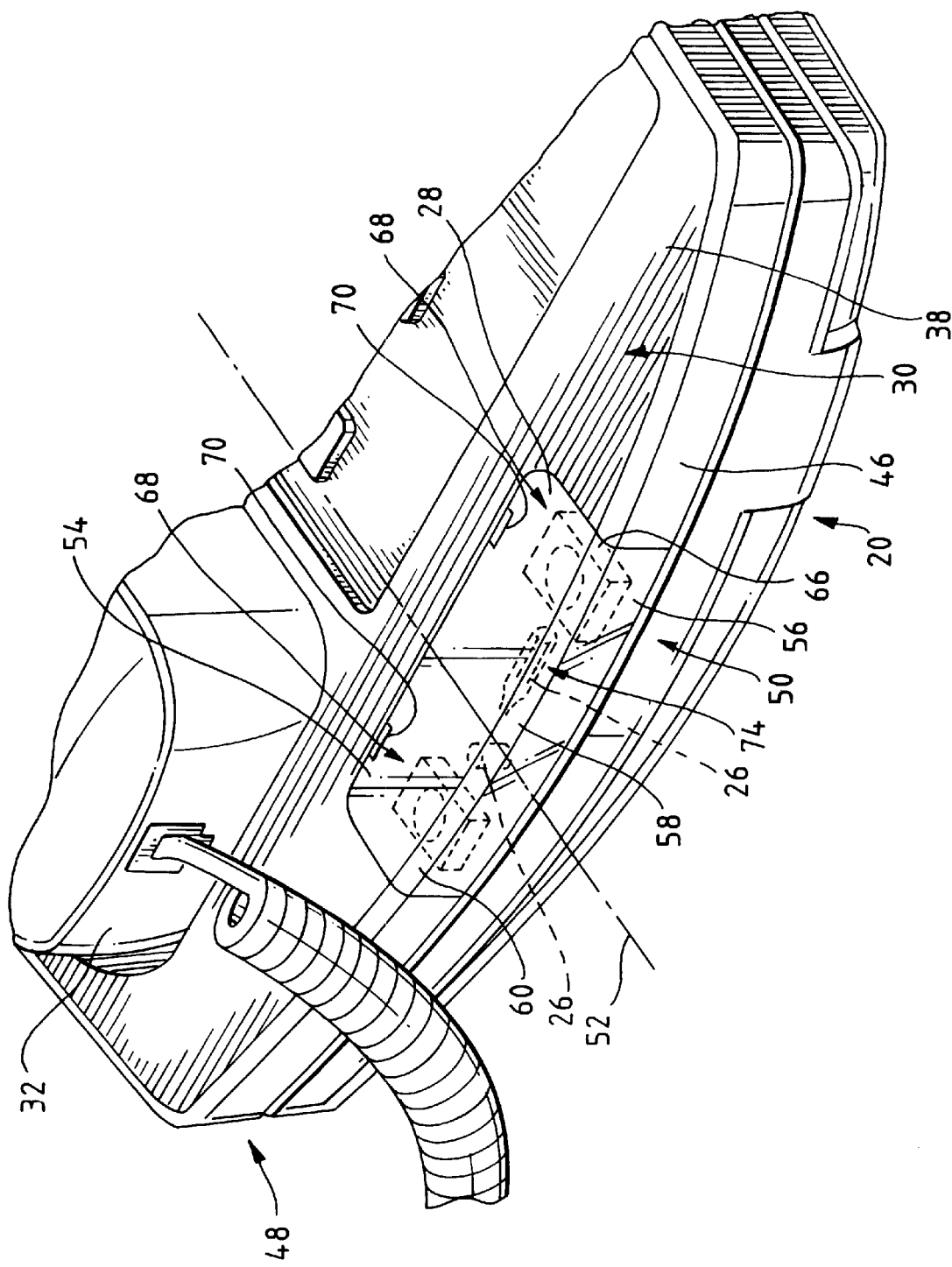
FIG. 3 is an enlarged partial view of the guestroom telephone shown in FIG. 2 particularly illustrating components located under the message waiting touch bar.

Referring now to FIGS. 1–3, the guestroom telephone 20 is shown generally in FIG. 2. The guestroom telephone 20 includes a telephone case or housing 30, which houses all of components, and which housing may be formed of plastic or metal, as is known in the art. The telephone 20 further includes a handset 32, a keypad 34, a plurality of special buttons 36, and the message retrieval touch bar 28 or button.

The telephone case 30 includes a top surface portion 38 and a front wall portion 46 that downwardly depends from the top surface portion 38, and extends around a perimeter 48 of the top surface portion 38. The front wall portion 46 may be curved as shown in the illustrated embodiment.

As shown in FIGS. 2 and 3, the message retrieval touch bar 28 is preferably in the form of a wide, red, back-lighted translucent lens or shell located on a front edge portion 50 of the telephone case 30, and may be in the shape of an elongated rectangular bar, but may be of any suitable shape. It may be formed of plastic and is preferably a thin translucent lens or shell, but may be clear or frosted. Preferably, the message retrieval touch bar 28 is about two inches in length. Preferably, the message retrieval touch bar 28 is located toward the front portion 50 of the telephone housing 30 along a central longitudinal axis 52 of the telephone housing 30. Due to the location of the message retrieval touch bar 28 on the telephone housing 30, light emitted by the message waiting indicators 26 located under the touch bar 28 is easily visible to the user when viewed from both a top perspective and a side perspective relative to the telephone housing 30. As shown in FIG. 3, the message retrieval touch bar is shown as translucent for purposes of illustration only so as to permit viewing of the components thereunder.

The message retrieval touch bar 28 includes a first planar portion 54 and a second planar portion 56 depending downwardly from the second planar portion 56. It is preferably formed as a one piece rigid construction such that the first planar portion 54 and second planar portion 56 are joined along a common edge 58, at an angle of about between seventy-five degrees and one-hundred and forty-five degrees. The common edge 58 may be curved to conform to the curved contour of the front wall portion 46, or may include a bevel 60.

The message retrieval touch bar 28 is received within a recess 66 or cut-away portion of the top surface portion 38 and the front wall portion 46 so that the first planar portion 54 is substantially coplanar with the top surface portion 38 of the telephone, and the second planar portion 56 is substantially coplanar with the front wall portion 46 of the telephone. Note that the first and second planar portions 54, 56 need not be exactly flat, but may have a curved or sloping contour for aesthetic reasons. Alternately, the first and second planar portions 54, 56 may protrude or be slightly raised from the plane of the top surface portion 38 and the front wall portion 46, or may be slightly recessed from the plane of the top surface portion 38 and front wall portion 46. Within the recess 66 are two switches 68 disposed at opposite lateral edges of the recess 66, which are preferably push-button type momentary contact switches 68, as are known to one skilled in the art. Because the switches 68 are disposed at opposite lateral edges, finger pressure anywhere along the message retrieval touch bar 28 causes activation of one or both of the switches 68, which in turn activate the message retrieval function.

The message retrieval touch bar 28 preferably includes two or more hinges 70 that permit the message retrieval touch bar 28 to pivot or flex relative to the top surface portion 38 of the telephone 20. In operation, when the user depresses the message retrieval touch bar 28, the light finger pressure causes the message retrieval touch bar 28 to contact one or both of the two switches 68. Because the switches 68 are connected in parallel and are disposed at opposite lateral edges of the recess 66, depression of the message retrieval touch bar 28 anywhere along its surface causes activation of at least one of the switches 68. This, in turn, causes the stored voice mail message to be retrieved, as described herein. Alternately, only one switch may be located in the recess 66 without changing the general function of the telephone.

Once either of the two switches 68 is closed, the guestroom telephone 20 sends a preprogrammed sequence of stored DTMF tones to the hotel PABX 12 and the voice mail system 18. When received by the hotel PABX 12, the DTMF tones command the PABX and voice mail system 18 to retrieve and playback the stored messages for the corresponding guestroom telephone 20, as will be described in greater detail below.

The two light emitting elements or the message waiting indicators 26 are located within the recess 66, namely an LED 72 and a neon lamp 74. Such message waiting indicators 72, 74 inform the user that a voice message is pending. The term "message waiting indicators 26" is used interchangeably with the LED 72 and the neon lamp 74. Note that as described above, the message retrieval touch bar 28 is preferably red in color and translucent, and because it is disposed directly over the message waiting indicators 72, 74, it appears to glow or emit light when either of the message waiting indicators 72, 74 are lit, thus alerting the user that a message is waiting. When the message waiting indicators 72, 74 are lit, a portion of the light emitted by the message waiting indicators illuminate a portion of the message retrieval touch bar 28. Accordingly, the glowing message retrieval touch bar is highly visible.

The message retrieval touch bar 28 is preferably formed as a lens so as to concentrate the light emitted. Preferably, the neon lamp 74 is positioned lengthways across the red translucent message retrieval touch bar 28 so as to permit the maximum possible amount of light from the neon lamp 74 to pass through the message retrieval touch bar 28. Note that because of the size, shape, and intense red color of the message retrieval touch bar 28, the light produced by the LED 72 and the neon lamp 74 is very bright and easy to see, even in a brightly lighted room.

Figure 4:
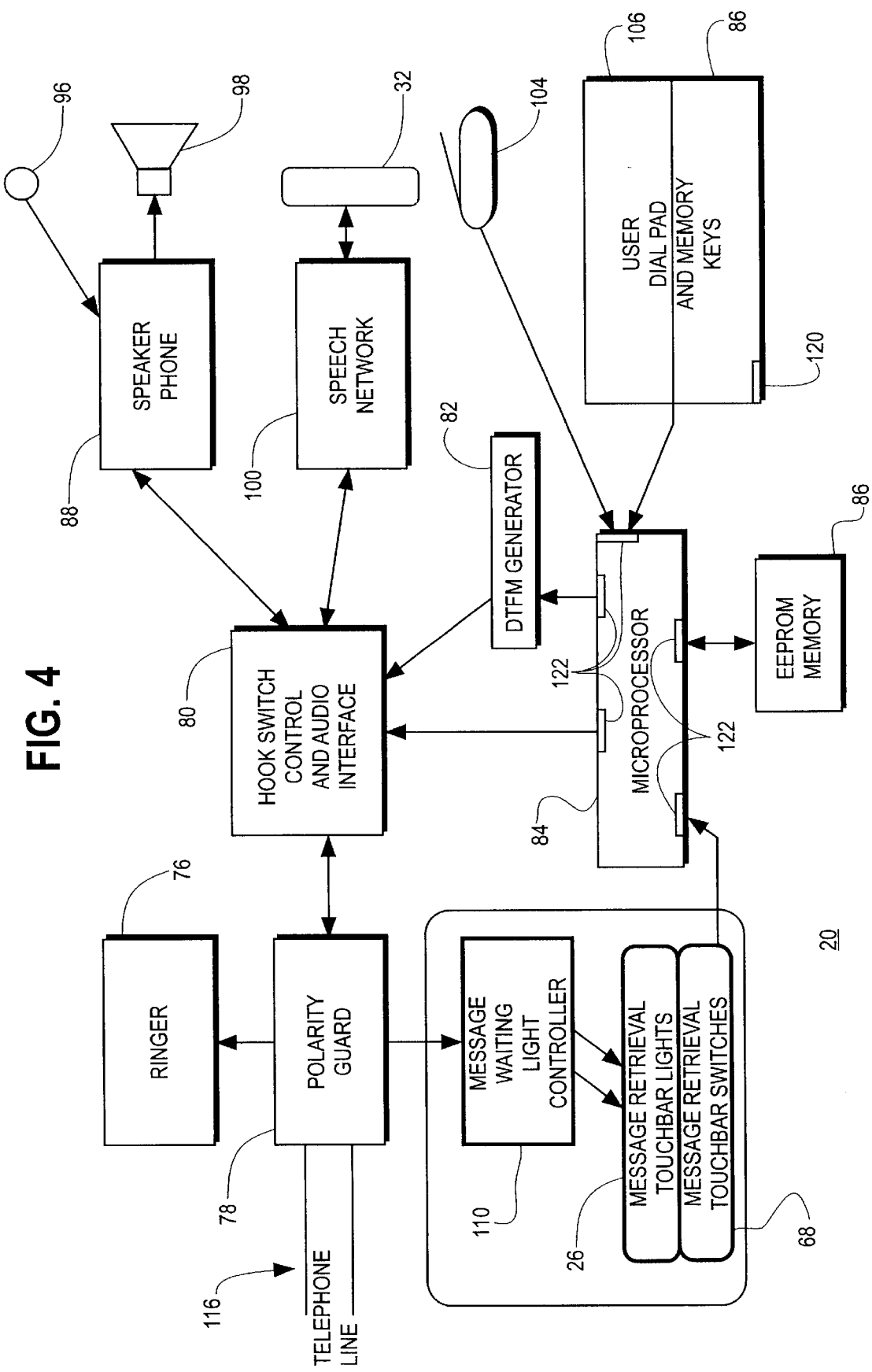
FIG. 4 is a block diagram of a specific embodiment of a guestroom telephone.

Referring now to FIG. 4, a block diagram of the guestroom telephone 20 is shown. The guestroom telephone 20 includes the following blocks or circuits: a ringer circuit 76, a polarity guard circuit 78, a hook switch control and audio interface circuit 80, a DTMF generator 82, a microprocessor circuit 84 or controller (with memory 86), a speakerphone circuit 88 (with a microphone 96 and a speaker 98), a speech network circuit 100 (with a handset 32 and a hook switch 104), a user dial pad 106 and speed-dial and memory 86 keys, a message waiting light controller circuit 110 (including the message waiting indicators 26 or lights, the message retrieval touch bar 28 and the switches 68).

Some of the blocks or circuits shown in FIG. 4 and described herein are known and are used in commercially available telephones. Such known circuits include the ringer circuit 76, the polarity guard circuit 78, the hook switch control and audio interface circuit 80, the DTMF generator 82, the speakerphone 88 circuit (with microphone 96 and speaker 98), the speech network circuit 100 (with handset 32 and hook switch 104), and the user dial pad 106 and memory 86 keys.

The ringer circuit 76 may be a single integrated circuit that responds to a 20 Hz. AC signal present on the telephone lines, referred to as the tip and ring telephone lines 116. Any suitable commercially available ringer circuit 76 may be used. For example, the model LS 1240 ringer circuit 76 manufactured by Thomson Electronics may be used. The polarity guard 78 may be implemented as a bridge rectifier and is connected to the tip and ring lines 116, as is known in the art. The polarity guard 78 insures proper operation of the telephone even if the connection to the tip and ring lines 116 are reversed by improper connection. The polarity guard 78 maintains the telephone connection as "polarity independent."

The hook switch control and audio interface circuit 80 is preferably an electronic switch circuit, meaning that the actual hook switch 104 does not cause direct electrical connection or closure with respect to the telephone circuitry. Rather, the hook switch 104, which is a mechanical switch, is connected to the microprocessor 84. The microprocessor 84, in turn, senses when the mechanical hook switch 104 is open or closed, and sends the appropriate signal to the hook switch control and audio interface circuit 80 in response thereto. The audio interface portion of the hook switch control and audio interface circuit 80 handles implementation of full duplex audio communication, as is known in the art.

The speech network circuit 100 may be coupled to the handset 32, and controls the various ways in which the audio signals are directed to the handset 32. The DTMF generator 82, which is controlled by the microprocessor 84, may be any suitable commercially available DTMF generator, as is known in the art. The DTMF generator 82 generates the dual tone frequency signals in response to depression of the various dial pad keys 106, 86 on the telephone, which may include a speakerphone key 120 (FIG. 4). The DTMF generator 82 is also coupled to the hook switch control and audio interface circuit 80 so that the tones are properly conditioned with respect to amplitude. The speakerphone circuit 88 receives signals from the hook switch control and audio interface circuit 104. The audio speaker 98 may be any suitable speaker, such as a loud speaker, a piezo-electric element, a electrostatic element, a tweeter, a woofer, a horn speaker, a moving coil speaker, and the like.

The message waiting light controller circuit 110 receives input signals from the polarity guard 78 and, in turn, issues signals to the message waiting indicators 26, as will be described in greater detail below. The two switches 68 located under the message retrieval touch bar 28 are connected to the microprocessor 84. The microprocessor circuit 84 controls the functions of the guestroom telephone 20. The microprocessor 84 includes the memory 86, such as EEPROM, and may also include RAM, ROM, EARPROM and the like, as well as input/output circuitry 122, such as I/O ports. The microprocessor 84 receives signals from the switches 68 and from the user dial pad 106 and other various special buttons 86. Any suitable microprocessor may be used. For example, the microprocessor may be a controller, computer, CPU (central processing unit), RISC processor, single-chip computer, distributed processor, server, microcontroller, controller, discrete logic computer and the like. The microprocessor 84 may have the memory 86, the I/O posts 122 and other support functions integrated into a single chip or board, or may have such functionality included in chips or devices separate and apart from the microprocessor.

Figure 5:
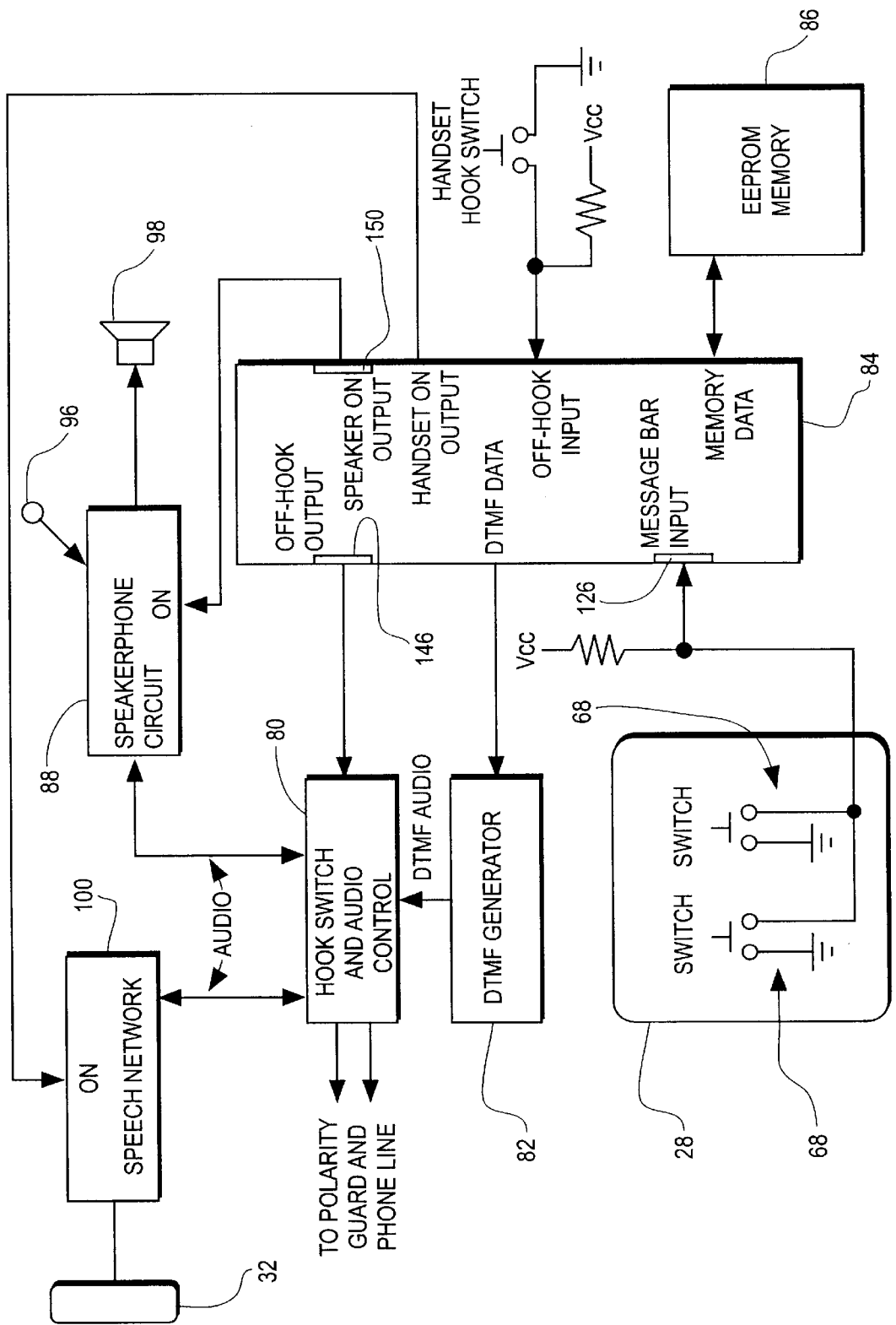
FIG. 5 is a block diagram of a specific embodiment of a guestroom telephone showing additional connections between the blocks shown in FIG. 4.
Figure 8:
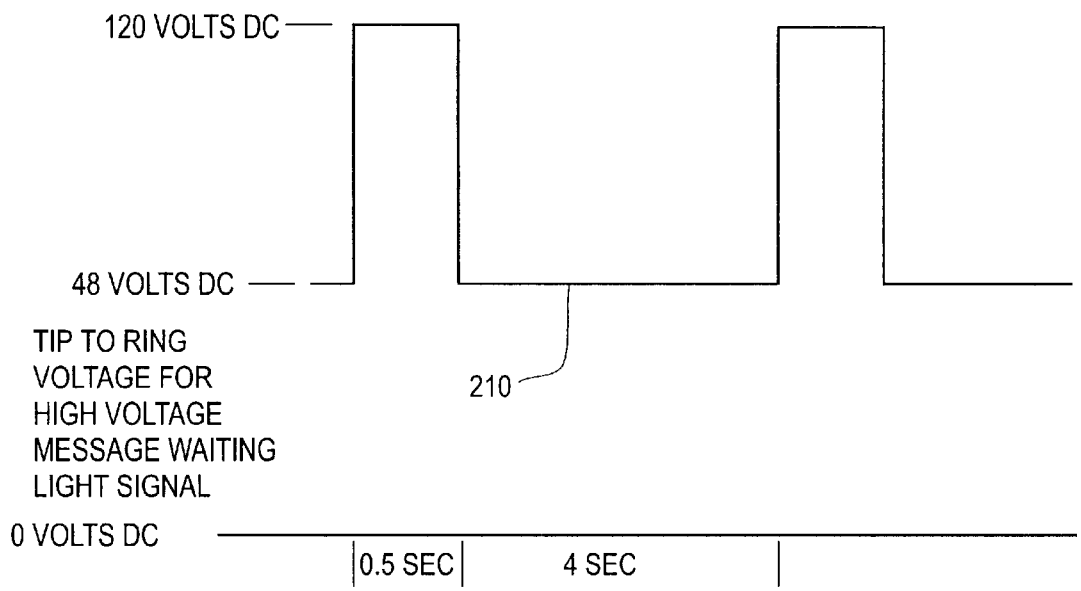
FIG. 8 is a waveform diagram illustrating a specific embodiment of a high voltage message waiting light signal.

Referring now to FIGS. 3–6, note that FIG. 5 includes some of the same or similar blocks or circuits as is shown in FIG. 4. Accordingly, such similar blocks shall be identified by like reference numbers. FIG. 5 includes additional detail with respect to the connection between the blocks or circuits shown in FIG. 4. As described above, the two switches 68 are located directly under the message waiting touch bar (FIGS. 3 and 8). As shown pictorially in FIG. 3 and shown schematically in FIG. 5, the two switches 68 are connected parallel and are connected to a message bar input I/O (input/output) pin 126 of the microprocessor. When either or both of the switches 68 are closed, the microprocessor 84 executes a "message retrieval" program stored in memory, which program is described in conjunction with the flowchart shown in FIG. 6, wherein the various "steps" are indicated.

Figure 6:
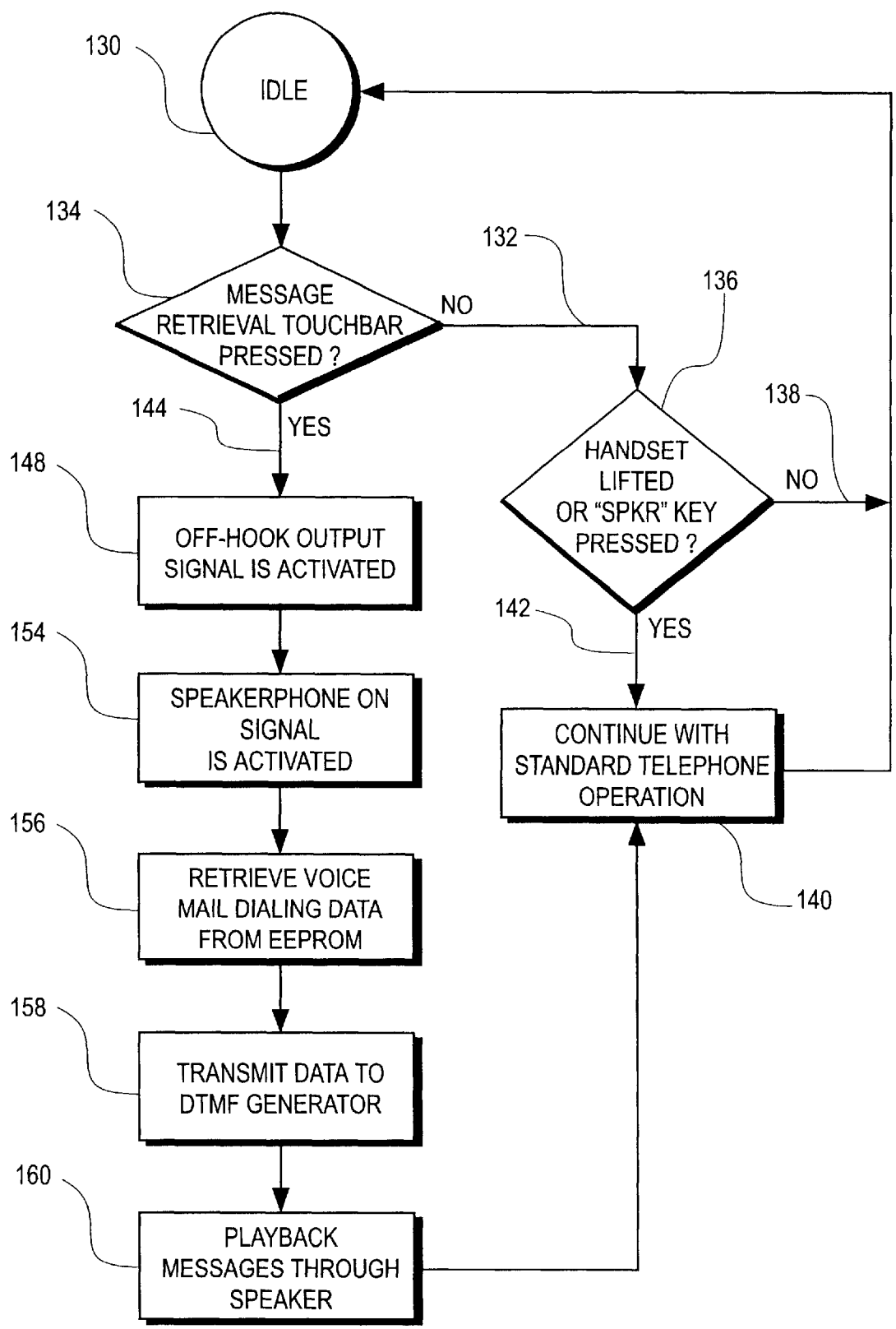
FIG. 6 is a flowchart illustrating a specific embodiment of a message retrieval program in the guestroom telephone.

The message retrieval sequence program executed by the microprocessor 84 and shown in FIG. 6 may occur even when the telephone is in the on-hook condition. The program begins at a step 130. When the telephone is in the on-hook condition and the message retrieval touch bar 28 has not been depressed, as shown in a "no" branch 132 of a step 134, the software resident in the microprocessor memory 86 branches to a step 136 to determine if the handset 32 has been lifted or the speakerphone key 120 (FIG. 4) has been depressed. If the handset 32 has not been lifted and the speakerphone key 120 has not been depressed, the software branches back to the idle condition, as shown in a "no" branch 138 of the step 136. The standard or normal operation of the guestroom telephone 20, as shown in a step 140 occurs when the handset 32 has been lifted or the speaker key 120 has been depressed, as shown in a "yes" branch 142 of the step 136.

When the message retrieval touch bar 28 is depressed, as shown in a "yes" branch 144 of the step 134, the microprocessor 84 issues a signal on an off-hook output I/O pin 146 to place the telephone in the off-hook condition, as shown in a step 148. Simultaneously, the microprocessor places the telephone in a speakerphone mode by activating a "speaker-on" output I/O pin 150 of the microprocessor 84, as shown in a step 154.

Activation of the speaker-on output I/O pin 150 causes the speakerphone circuit 88 to turn on, while the off-hook output signal directs the hook switch and audio control circuit 88 to place the telephone in the off-hook condition. Next, as shown in a step 156, the microprocessor 84 retrieves stored dialing data from memory or EEPROM memory 86, and sends the appropriate logic commands to the DTMF generator 82, as shown in a step 158. The DTMF generator 82 then transmits a preprogrammed series of DTMF tones to the hotel PABX 12 through the phone lines 116 (FIG. 4) to facilitate the retrieval of the voice messages.

This sequence of DTMF tones can include "flash" and "pause" commands as well as digits 0–9, *, and #. In some PABX 12 and voice-mail systems 18 (FIG. 1), it may necessary to first dial the voice mail system's telephone extension number, then pause for between one and ten seconds to allow the voice-mail system sufficient time to answer and dial the specific pass-code for the guestroom's extension.

A "pause" period may be required because the PABX 12 and the voice-mail systems 18 (FIG. 1) may be two separate units, rather than one integrated system. The "pause" command in the dialing sequence provides sufficient time for the voice mail system 18 to receive and respond to the DTMF commands, which cause the voice mail system to playback the recorded messages. By providing a "pause" function that can be stored into the pre-programmed DTMF sequence, any necessary pauses can easily be programmed to ensure trouble-free operation of voice mail message playback. Preferably, the stored DTMF command sequence may contain up to sixteen digits, including "flash" and "pause" commands. Each "pause" command halts further DTMF transmissions for about 3.6 seconds. When the hotel PABX 12 (FIG. 1) receives the first portion of the sequence of pre-programmed DTMF signals from the guestroom telephone 20, it contacts or calls the voice mail system 18. The second portion of the pre-programmed DTMF sequence, after a sufficient pause time, is then transmitted to the voice-mail system by the PABX 12. The DTMF sequence then causes the playback of the stored voice messages to the guest in the room, as shown in a step 160.

At this time, the DTMF generator 82 becomes idle and the user hears the stored messages played back through the speakerphone circuit 88, as shown in the step 160. Note that the user may listen to the stored messages without pressing any other keys on the telephone and without lifting the handset 32. Should the user wish to listen to the messages privately, the user need only lift the handset 32. When the handset 32 is lifted, the speakerphone circuit 88 turns off the speaker 98, and all audio transmission may be heard via the handset 32.

It is noted that unlike known telephones, the present invention only requires a single action by the user, that is, depressing a message retrieval touch bar 28 to permit the user to retrieve his or her stored messages. The single action by the user of activating the message retrieval touch bar 28 causes the voice message to be retrieved and the audio speaker 98 to be automatically activated such that the voice message is output on the audio speaker 98 without the user lifting the handset 32. The user need not first lift the handset 32 then depress an additional key to effect retrieval of the messages. In the present invention, single depression of the message retrieval touch bar 28 causes the telephone to transmit the DTMF signals to the PABX, which causes the PABX 12 or voice mail system 18 to retrieve and transmit the voice messages to the guestroom telephone 20.

Figure 7:
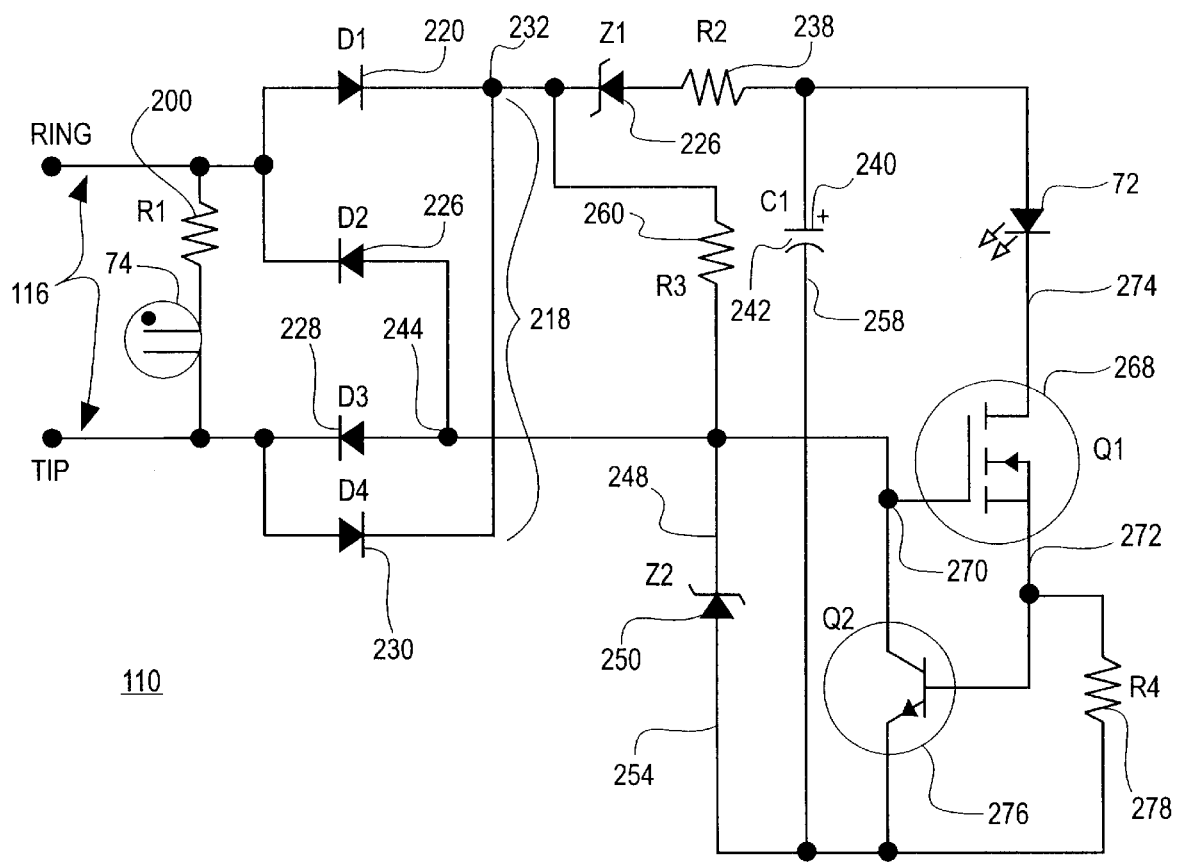
FIG. 7 is a schematic diagram of a specific embodiment of a message waiting light controller circuit shown in FIG. 4.

Referring now to FIGS. 4 and 7, the message waiting light controller circuit 110 of FIG. 4 is shown in greater detail in FIG. 7. As described above, PABX switchboards generally provide the capability to send signals to the guestroom telephone 20 to alert the user that a voice message is pending. Such PABX systems may cause the message waiting indicators 72, 74 on the guestroom telephone 20 to blink. However, due to the large number of different technologies and different types of PABX systems in use, there are several different signaling methods between the PABX and guestroom telephone 20 in wide usage.

The message waiting light controller circuit 110 in conjunction with the mechanical and physical construction of the message retrieval touch bar 28, as described above, maximizes the amount of visible light emitted by the message waiting lights 72, 74. The message waiting light controller circuit 110 also minimizes current drain from the telephone line 116, thus permitting several telephones to be connected to the same telephone line in parallel such that the message waiting indicators 72, 74 of all of the parallel guestroom telephones will function with full brightness and without excessive drain on the telephone line.

The message waiting light controller circuit 110 receives and automatically decodes a variety of different PABX message waiting indicator control signals, including a high-voltage or neon-type signal, and a low-voltage or LED type signal, without modification or customization of the existing guestroom telephone 20 or the PABX. No internal switching or reconfiguration, such as setting various switches, is needed. This greatly simplifies telephone installation or therefore replacement for the hotel, and reduces time, labor, and equipment costs associated therewith. In operation, when a message for the guest is received, either the desk clerk or the automated attendant software installed in the hotel voice mail system 18 sends a "message-waiting light on" command for the particular room number to the PABX 12 system.

The message-waiting light on command causes the PABX 12 to send out a periodic electronic signal ("message waiting light signal) over the telephone line 116 coupled to the hotel room containing the guestroom telephone 20. When the message waiting light controller circuit 110 receives the message waiting light signal, the message waiting indicators 72, 74 blink periodically, for example, every few seconds. The message waiting indicators 72, 74 are operatively coupled to the message waiting controller circuit 110 and are responsive thereto.

Because there are two different types of message waiting light signals commonly issued by PABX units installed in hotels, the guestroom telephone 20 includes two different light-producing devices mounted under the red message retrieval touch-bar 28, namely the neon lamp 74 and the LED 72. Referring now to FIG. 7, a conventional the neon lamp 74 connected directly across the incoming tip and ring telephone line 116 is shown with a series current limiting resistor R1 (200). The resistor R1 (200) limits the maximum current flow through the neon lamp 74 to approximately 1 mA. The neon lamp 74 will light when the DC voltage on the telephone line 116 rises from the standard 48 volts to approximately 120 volts DC while the telephone is in an "on-hook" condition.

Figure 9:
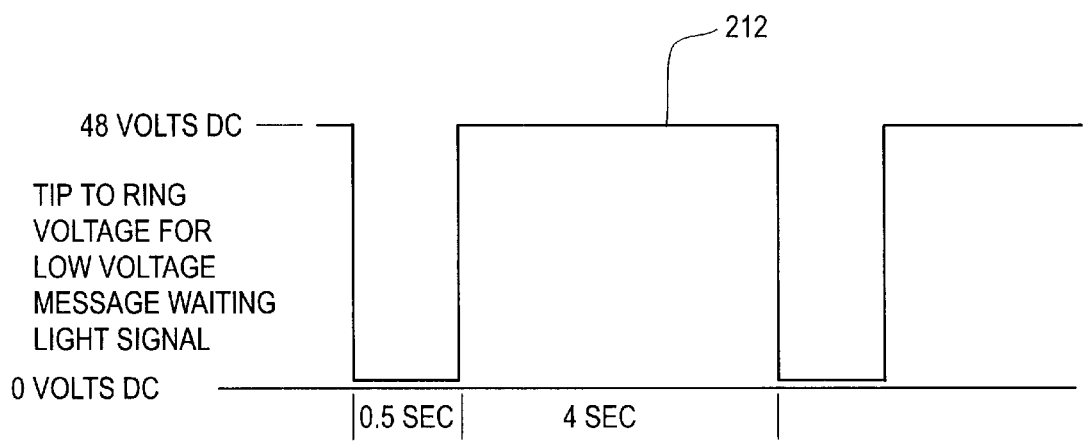
FIG. 9 is a waveform diagram illustrating a specific embodiment of a low voltage message waiting light signal.

Referring now to FIGS. 7–9, a graphical representation of the voltage waveform for a high-voltage message waiting light signal 210 is shown in FIG. 8. When the tip-ring voltage rises from 48 to 120 volts, the neon lamp 74 conducts and becomes illuminated. Typically, the high voltage message waiting light signal 210 produced by PABX systems is one where the DC voltage across the telephone line 116 momentarily rises from 48 volts to 120 volts for about 0.5 seconds, and occurs periodically about every 2 to 4 seconds.

Some newer PABX systems, however, employ an alternate type of message waiting light signal, referred to as a low-voltage or LED message waiting light signal 212, as shown geographically in FIG. 9. One form of the low voltage message waiting light signal 212 produced by PABX systems is one where the DC voltage across the telephone line 116 momentarily drops from 48 volts to 0 volts for about 0.5 seconds, and occurs periodically about every 2 to 4 seconds.

The low voltage message waiting signal 212 is not compatible with telephones only having the neon lamp 74, and such a signal will fail to cause the neon lamp 74 to light up. Accordingly, newer PABX systems cannot be used with guestroom telephones that only have a neon lamp 74 type message waiting indicator. For example, if a hotel upgrades the PABX equipment, all guestroom telephones having only a neon lamp must be replaced. This can be very costly. In the present invention, however, the message waiting light controller circuit 110 receives and recognizes both the high voltage message waiting light signal 210 (neon lamp 74) and the low voltage message waiting light signal 212 (LED 72). Accordingly, the message waiting light controller circuit 110 is configured to receive and recognize the message waiting signals sent by the PABX in a plurality of formats.

As described above, the low voltage message waiting light signal 212 is received over the tip and ring lines 116 of the incoming telephone lines. The low voltage message waiting light signal 212 is routed to a polarity protection rectifier, referred to a bridge rectifier 218. The bridge rectifier 218 is composed of diodes D1 (220), D2 (226), D3 (228), and D4 (230). An output of the bridge rectifier 218 will always be a positive DC voltage or 0 volts, depending on the state of the low-voltage message waiting signal 212. When the telephone handset 32 is in the "on-hook" state, the voltage at a positive output terminal 232 of the bridge rectifier 218 is normally about 48 volts. This voltage is dropped across a zener diode Z1 (236), where the maximum current flow limited by a series resistor R2 (238). The series resistor R2 (238) is in turn connected to a positive terminal 240 of a capacitor C1 (242), which may be for example, a 10 uF capacitor. By dropping approximately 27 volts across the zener diode Z1 (236), the LED 72 will not produce any nuisance or spurious flashes while the telephone is in the off-hook condition because the voltage from tip to ring is always less than 15 to 18 volts whenever the telephone is in the off-hook condition.

When in the normal on-hook condition, the positive terminal 240 of the capacitor C1 (242) will quickly charge up to a voltage of approximately 21 volts DC. The resistor R2 (238) is sufficiently large so as to maintain the maximum instantaneous charging current of the capacitor C1 (242) under approximately 1 mA. This minimizes the load on the PABX telephone lines 116 and permits several telephones to operate in parallel on the same telephone line without loss of performance or excessive drain. A negative output 244 of the polarity protection bridge rectifier 218 is connected to a cathode terminal 248 of a zener diode Z2 (250). An anode 254 of the zener diode Z2 (250) is connected to a negative terminal 258 of the capacitor C1 (242) so that when current flows into the positive terminal 240 of the capacitor C1 (242) through the resistor R2 (238), the zener diode Z2 (250) will conduct in the forward biased direction, and the negative terminal 258 of the capacitor C1 (242) will be held to a DC voltage no greater than 1 volt above the negative output of the bridge rectifier 218.

When the tip and ring voltage briefly drops to 0 volts, thus activating the message waiting indicators 72, 74, the DC voltage at the output 232, 244 of polarity protection bridge rectifier 218 will also momentarily drop to 0 volts, due to the loading action of a resistor R3 (260). At such time, the forward current flow through the zener diode Z2 (250) stops. The resistor R3 (260) preferably has a value of several megaohms so as to reduce loading on the PABX telephone lines 116. An N-channel enhancement-mode MOSFET transistor Q1 (268), having a gate terminal 270, a source terminal 272 and drain terminal 274 is shown connected between the LED 72 and the zener diode Z2 (250). Because the capacitor C1 (242) now maintains a charge of at least 20 volts, even a small amount of current flow through the resistor R3 (260) will momentarily raise the voltage at the gate 270 of the MOSFET Q1 (268) to approximately 18 volts.

To protect the MOSFET Q1 (268) from possible transient damage, the zener diode Z2 (250), which is now reverse biased, prevents the gate-to-source voltage on the MOSFET Q1 (268) from rising above 18 volts. The source terminal 272 of the MOSFET Q1 (268) is connected to the negative terminal 258 of the capacitor C1 (242), while the gate terminal 270 of the MOSFET Q1 (268) is connected to the resistor R3 (260) and to the cathode 248 of the zener diode Z2 (250). When the gate voltage of the MOSFET Q1 (268) rises to 18 volts, the MOSFET Q1 (268) turns on and conducts. The LED 72, which is preferably red in color, is connected to the drain terminal 274 of the MOSFET Q1 (268), and the stored charge in the capacitor C1 (242) flows through the LED 72 into the drain terminal 274 of MOSFET Q1 (268), causing the LED 72 to emit a burst of bright red light. At the end of the low-voltage message waiting light signal (zero volt pulse), the polarity of the voltage on the zener diode Z2 (250) reverses, the MOSFET Q1 (268) turns off, and the capacitor C1 (242) again begins to charge up to about 20 volts. This cycle repeats each time the incoming phone line voltage drops to 0 volts, causing repetitive blinking of the LED 72 located under the message retrieval touch bar 28.

A transistor Q2 (276) and a resistor R4 (278) in the source circuit of the MOSFET Q1 (268) limit the maximum current flow through the LED 72. This maintains the maximum possible brightness of the LED 72. Other known message waiting light circuits using capacitors and LEDs lack a mechanism to tightly control the maximum peak current flowing through the LED 72.

The LED 72 is preferably a commercially available high-efficiency LED, which LED typically reach maximum brightness with a current flow of no more than 10 to 20 mA. There is no advantage to permit the current flow through this type of LED to increase above 20 mA, as this may damage the LED, and will not increase the output brightness. By limiting the maximum current flowing through the LED 72 to 20 mA or less, the length of the pulse of light produced by the LED as the capacitor C1 (242) discharges is greatly increased relative to known circuits. This improves the perceived brightness of the LED 72 when it flashes.

The value of the resistor R4 (278) is chosen so that when 20 mA flows through the LED 72 and the MOSFET Q1 (268), the voltage drop across the resistor R4 (278) becomes high enough to cause the NPN bipolar transistor Q2 (276) to conduct, thus reducing the gate voltage on the MOSFET Q1 (268) as needed to hold the current flow through the resistor R4 (278), the MOSFET Q1 (268), and the LED 72, to 20 mA or less. The current limiting effect of this circuit permits the LED 72 to blink brightly even when the on-hook tip-ring supply voltage from the PABX to the guestroom telephone 20 is considerably greater or lower than the typical 48 volts DC. For example, the brightness of the LED 72 is maintained substantially constant during blinking even though the on-hook tip-to-ring voltage ranges between 28 volts and 55 volts.

Figure 10:
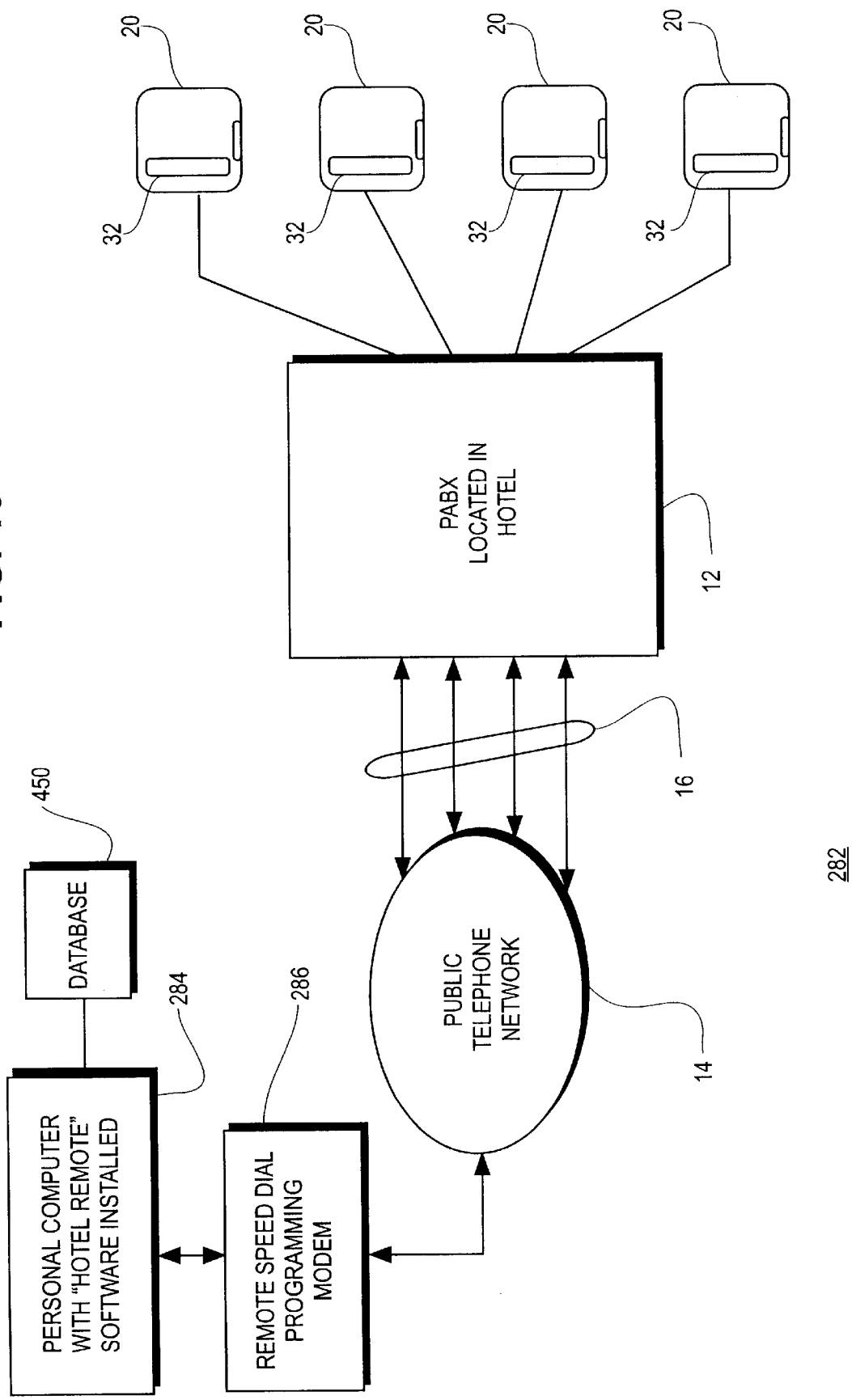
FIG. 10 is a block diagram of a specific embodiment of a telephone system with remote speed-dial programming capability, according to the present invention.
Figure 11:
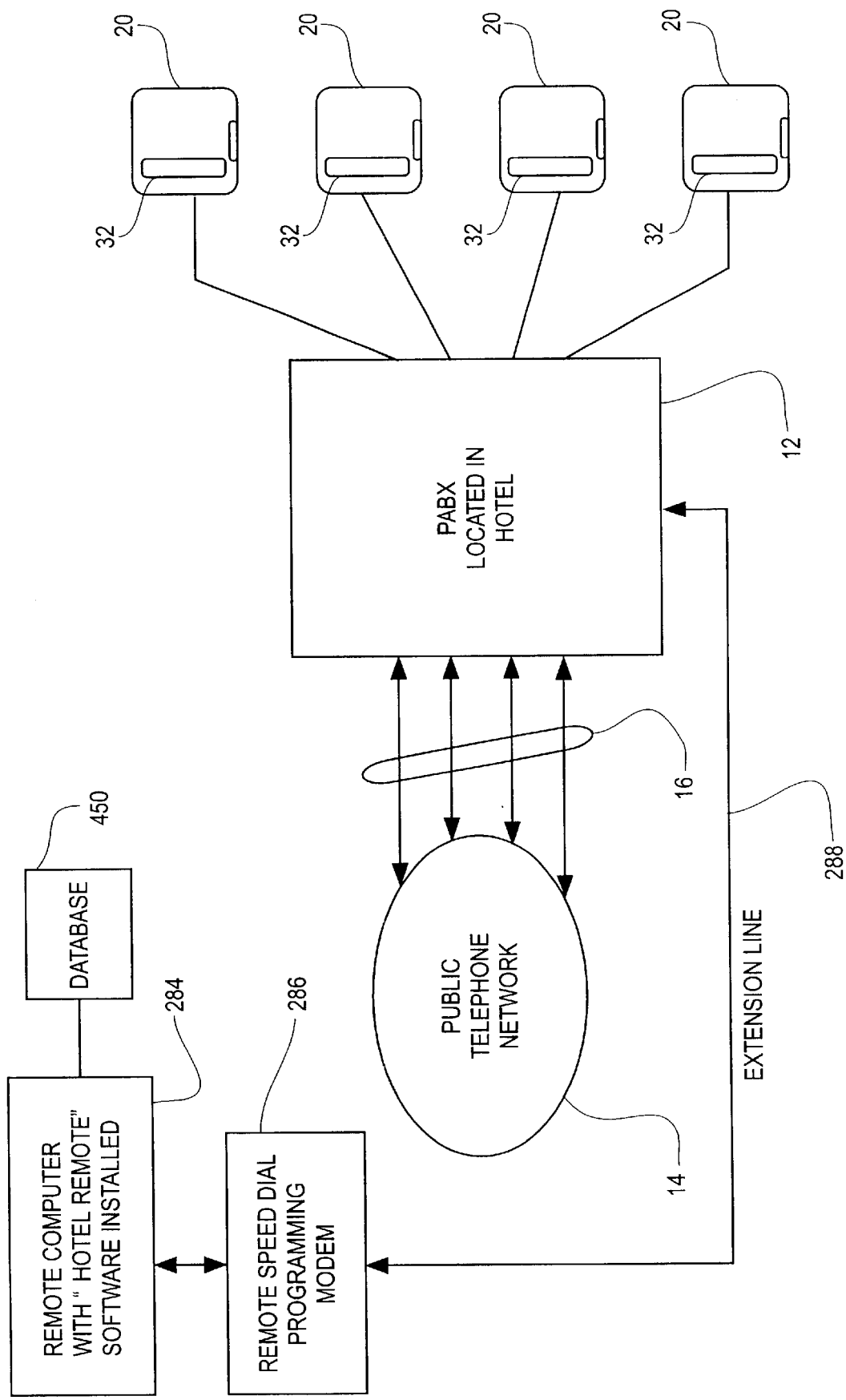
FIG. 11 is a block diagram of an alternate embodiment of a telephone system with remote speed-dial programming capability, according to the present invention.

Referring now to FIGS. 10 and 11, these figures show a telephone system 282 with remote speed-dial programming capability, generally. Some of the components shown in FIGS. 10 and 11 are similar to the components shown in FIG. 1, and accordingly will be given like reference numerals.

The specific embodiment illustrated in FIG. 10 shows, for example, the PABX 12 located in a hotel or other hospitality environment, and connected to the PSTN 14 by trunk the lines 16. At the other end of the PSTN, a computer or remote computer 284 is coupled to the PSTN 14 via a remote speed-dial programming modem 286. The remote computer 284 may be a personal computer, as is known in the art. However, any suitable computer may be used, such as an IBM brand compatible personal computer, having for example, a Pentium® microprocessor running under Windows® Unix and the like. The remote computer 284 may also be an APPLE® compatible personal computer. Additionally, the remote computer 284 may incorporate the remote speed-dial programming modem 286, and need not be separate and apart therefrom.

The computer may be remotely located from the guestroom telephone 20 and may connect to the guestroom telephone 20 through the PSTN 14. Such remote speed-dial programming of the guestroom telephone 20 may accordingly be performed from a remote location, such as from a field office, by placing a telephone call to the hotel PABX through the PSTN. Remote speed-dial programming may permit the remote computer 284 to program each guestroom telephone 20 with speed-dial data automatically and without intervention by hotel technicians.

In one specific embodiment, the PABX 12 may be configured to have its automated attendant answer on an incoming trunk line that is used for remote programming of the guestroom telephones 20. In this way, the extension number of the guestroom telephone 20 to be remotely programmed can be directly dialed by the remote computer 284. A connection is made from the PSTN 14 and hotel PABX 12 directly to the guestroom telephone 20, and the speed-dial programming is performed. Various "handshake" signals are exchanged between the remote computer 284 and the guestroom telephone 20 to confirm that all speed-dial data has been accurately received and stored inside the guestroom telephone 20, as will be described in greater detail below. This process is then repeated for each guestroom telephone 20 to be remotely programmed with speed-dial data.

In an alternate embodiment shown in FIG. 11, the remote computer 284 and the remote speed-dial programming modem 286 may be physically located inside the hotel, and may be connected to an available extension line 288 on the hotel PABX 12. For example, the remote computer 284 and the remote speed-dial programming modem 286 may reside in the manager's office or in the "telephone room." In this case, only the extension number for each guestroom telephone 20 to be remotely programmed need be dialed. Preferably, speed-dial programming is performed at times when the guestroom is unoccupied. Because, however, most hotel switchboard systems include voice mail systems that automatically answer incoming voice calls to the guest room, such systems must be turned off when speed-dial programming is desired.

Figure 12:
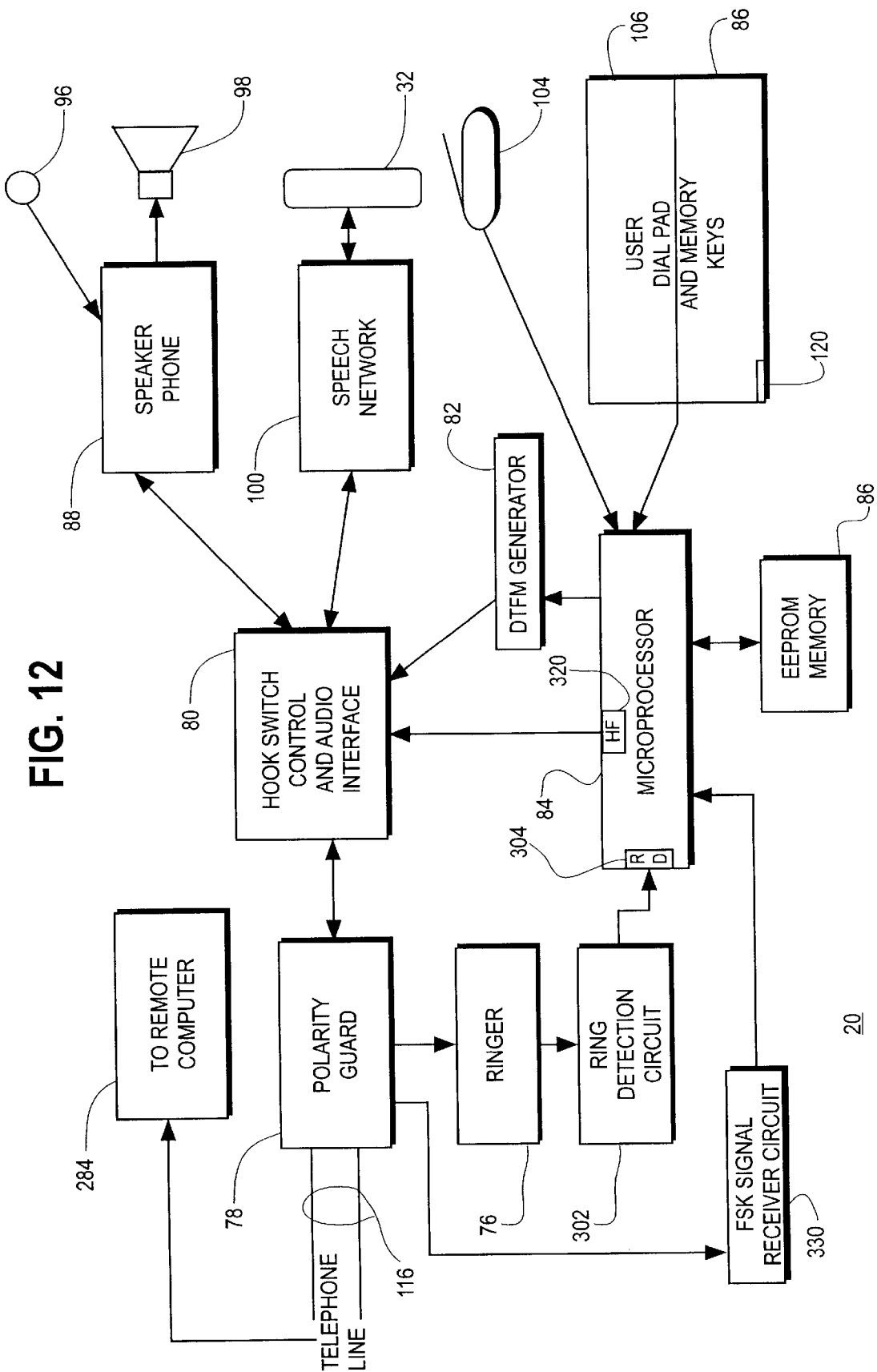
FIG. 12 is a block diagram of a specific embodiment of a guestroom telephone having remote speed-dial programming capability.
Figure 13A:
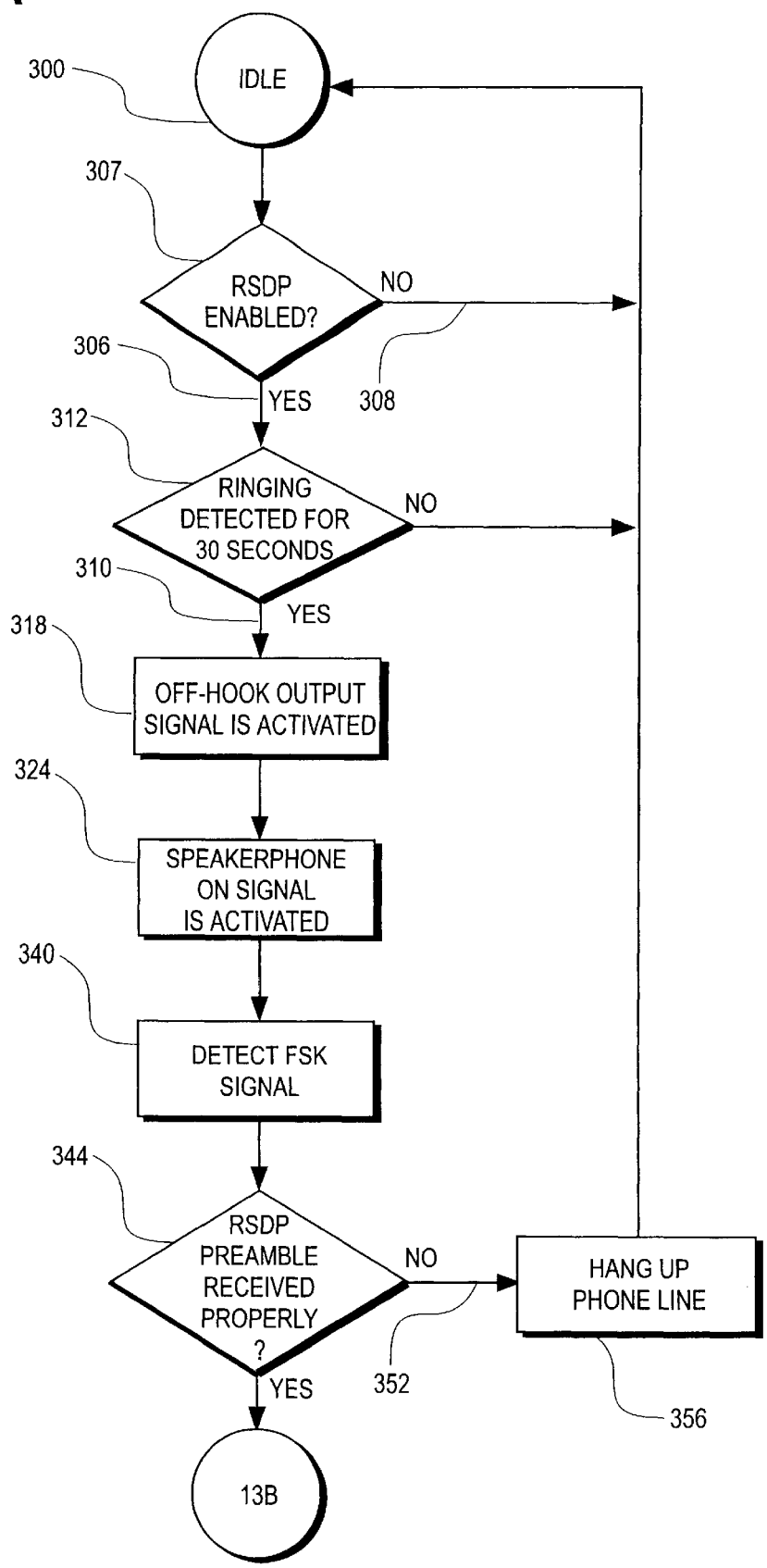
FIGS. 13a and 13b are two sheets of a single flowchart illustrating a specific embodiment of a speed-dial programming sequence, as performed by the guestroom telephone.
Figure 13B:
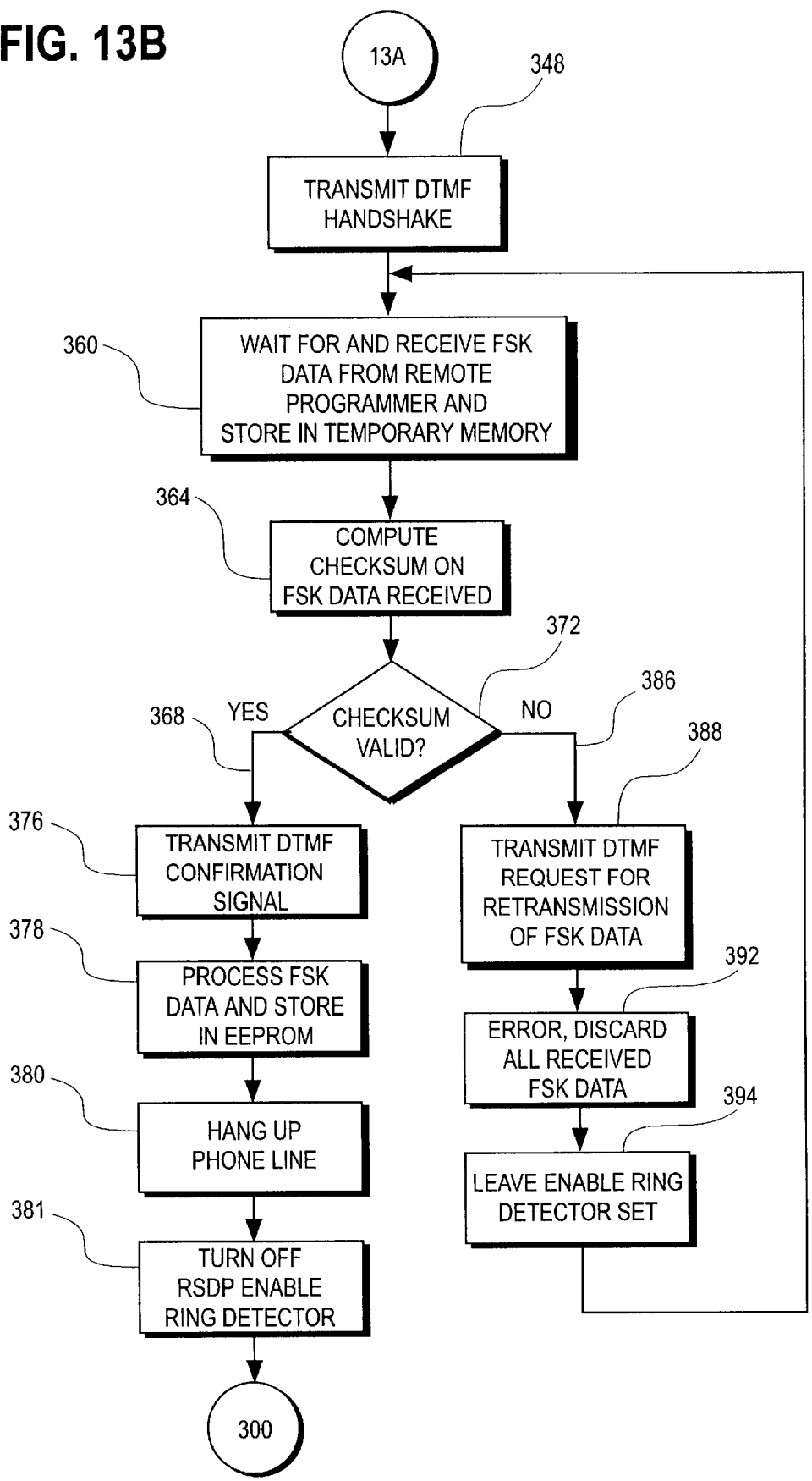

Referring now to FIGS. 12, 13a and 13b, FIG. 12 is a block diagram of an alternate embodiment of the guestroom telephone 20, while FIGS. 13a and 13b illustrate a single flowchart of the steps that may be performed by the microprocessor or controller 84 in the guestroom telephone 20 to effect programming of the guestroom telephone 20. FIGS. 12, 13a and 13b should be viewed together. Note that some of the components shown in FIG. 12 are similar to the components shown in FIG. 4, and accordingly will be given like reference numerals.

As shown in a step 300, the software executed by the microprocessor 84 in the guestroom telephone 20 is initially in an idle mode. In one specific embodiment, the housekeeping staff may optionally "enable" remote programming for each guestroom telephone 20 to be programmed or reprogrammed. This may be performed on each guestroom telephone 20 by a simple key sequence, which does not require removal of the faceplate overlay. Note that no speed-dial programming is done at this point—only enabling of the guestroom telephone 20 to permit remote programming. This can be done quickly and easily by the housekeeping staff without special training or technical skill. Enabling the remote programming mode causes the microprocessor 84 to set an "enable ring detection flag."

The guestroom telephone 20 includes a ring detection circuit or call recognition circuit 302 operatively coupled to the ringer circuit 76. The ringer circuit 76 causes a warbling sound to be emitted when the guestroom telephone 20 rings, as is known in the art. The ring detection circuit 302 determines when the guestroom telephone 20 has been ringing, but has not been answered for a period of about thirty seconds. In one specific embodiment, the ring detection circuit is coupled to an RD input pin 304 of the microprocessor 84. When a ringing signal reaches the guestroom telephone 20, the guestroom telephone 20 rings as it normally would, but the microprocessor 84 begins "counting" of a thirty second time period. Of course, the time period may be varied.

If the programming mode for guestroom telephone 20 has been enabled, as described above, the guestroom telephone 20 enters the ring detection phase, as shown in a "yes" branch 306 of a step 307. If the handset 32 is picked up in less than thirty seconds of ringing, or if the ringing signal terminates in less than thirty seconds, the ring detection circuit 302 signals the microprocessor 84 via the RD input pin 304 that the ringing has stopped. The microprocessor 84 then resets its thirty second timer, and the software again enters the idle mode 300, as shown in a "no" branch 308 of the step 307. The guestroom telephone 20 then continues to operate in a "standard" or "normal" telephone mode. Note that ring detection circuit 302 may be part of the microprocessor 84 or may be separate and discrete from the microprocessor.

In operation, after the remote programming mode has been "enabled" as described above, if the guestroom telephone 20 rings for more than thirty seconds without being answered, as shown in a "yes" branch 310 of a step 312, the microprocessor 84 enters a "programming mode." The microprocessor 84 then takes the phone "off-hook" (a step 318) by outputting a signal on an HF output pin 320 to the hook switch control and audio interface circuit 80. The microprocessor 84 also turns on the speakerphone 88 circuit (a step 324), and connects the incoming phone line 116 to an FSK (frequency shift keying) signal receiver circuit 330 so as to detect the FSK signal. The guestroom telephone 20 may enter the programming mode based on various criteria, such as a timed basis as described above, or based on the number of rings that have gone unanswered. Alternately, a caller identification circuit (not shown) may provide the telephone number of the caller, and if the identified telephone number matches a predetermined telephone number of the remote computer 284 (FIG. 10), the guestroom telephone 20 may enter the programming mode.

Preferably, the microprocessor 84 will not take the guestroom telephone 20 "off-hook" unless the remote programming feature has first been enabled, as described above, and as shown in the "no" branch 308 of the step 307. Immediately after the telephone has been taken off-hook, the FSK signal receiver circuit 330 is activated and receives a stream of FSK data from the telephone line 116, as shown in a step 340. The microprocessor 84 then compares the FSK data received to a "preamble" data sequence stored in the microprocessor or associated memory 86, as shown in a step 344. If the preamble data matches, the microprocessor 84 causes the DTMF generator 82 to send a handshake signal to the remote computer 284, as shown in a step 348. The handshake signal consists of a predetermined DTMF tone sequence, which is sent to the remote computer 284.

If the FSK data is not received properly, or if the preamble data does not match, as shown in a "no" branch 352 of the step 344, the microprocessor 84 turns off the speakerphone circuit 88 and disconnects the telephone line (a step 356) after about one second. The guestroom telephone 20 is then placed in a "normal" mode of operation or on-hook condition. Matching of the preamble data assures that the guestroom telephone 20 does not "lock up," or remain in an off-hook condition, and prevents inaccurate programming from occurring. If the preamble data was not received or was received improperly, the guestroom telephone 20 remains in the remote programming enable mode. This permits the remote computer 284 to again "retry" remote programming of the speed-dial data.

After the microprocessor acknowledges verification of the preamble (the step 348), the remote computer 284 sends the FSK encoded speed-dial data to the guestroom telephone 20. The microprocessor 84 receives and sequentially stores the FSK speed-dial data in a temporary memory, as shown in a step 360. After all the FSK speed-dial data has been received, the microprocessor 84 computes its checksum data word, as shown in a step 364. Next, the remote computer 284 sends its checksum data word to the guestroom telephone 20 for comparison. If the checksum data word generated by the remote computer 284 matches the checksum data word generated by the microprocessor 84, indicating that all of the FSK speed-dial data has been correctly received, as shown in a "yes" branch 368 of a step 372, the microprocessor 84 sends another handshake acknowledgement signal to the remote computer 284 in the form of a DTMF tone sequence, as shown in a step 376.

The microprocessor 84 then processes and stores the FSK speed-dial data into memory or "speed-dial memory 86" of the guestroom telephone 20, which memory is preferably the EEPROM, as shown in a step 378. The speed-dial data stored in the EEPROM memory 86 locations correspond to the speed-dial key on the guestroom telephone 20. However, any suitable memory 86 storage device may be used. Note that the guestroom telephone 20 does not require batteries or a backup power sources because the EEPROM memory 86 does not lose data upon removal of electrical power.

Once the remote computer 284 receives the handshake acknowledgement, the remote computer 284 terminates the connection, and the guestroom telephone 20 is placed in the on-hook condition, meaning that the call is terminated, as shown in a step 380. At this point, the guestroom telephone 20 is fully programmed with the speed-dial data and is ready for normal operation. The enable mode is then turned off, as shown in a step 381.

However, if the checksum data words did not match, indicating a transmission error, as shown in a "no" branch 386 of the step 372, the microprocessor 84 transmits a "not-acknowledge" DTMF tone sequence to the remote computer 284, which requests retransmission of the FSK data, as shown in a step 388. The microprocessor then discards the previously received FSK data stored in temporary memory 86, as shown in a step 392. In this case, the remote computer 284 will automatically re-send the FSK data. After three unsuccessful retries (now shown), the remote computer 284 will stop attempting to program this particular telephone, and will hang up and then proceed to dial the next telephone number in its list. Because the remote computer 284 terminated the connection in this fashion due to data transmission errors, the guestroom telephone 20 also terminates its connection. However, when such a programming error has occurred, the microprocessor leaves the "enable ring detection flag" set (a step 394) so that remote programming can be tried again at a future time without needing hotel personnel to physically revisit the guestroom and reenter the key sequence to enable the programming mode. The program then branches to the step 360 where it continues to wait for the data.

After successful speed-dial programming of the guestroom telephone 20, the enable ring detection flag is reset, as shown in the step 381. This may be done to avoid potential conflicts with some hotel "automatic wake-up call" systems. If the guestroom telephone 20 remained enabled and the automatic wake-up call system calls the guestroom telephone 20, the guestroom telephone 20 would answer after thirty seconds, and then disconnect because no preamble data was detected. The automatic wake-up call system would then be "fooled" and would determine that the guest had answered the wake-up call, when in fact, the guest had not. Accordingly, the guestroom telephone 20 is not permitted to remain in the enable remote programming mode indefinitely or after successful remote programming.

If reprogramming is desired again, the enable key sequence described above is again performed by the housekeeping staff. Although re-enablement of remote speed-dial programming may require a visit to the guestroom, the enable key sequence is very simple to perform and can be done by routine housekeeping personnel without dismantling the telephone or removing the faceplate overlay. For example, the "star" key may be depressed for five seconds to enable the remote programming mode.

Figure 14:
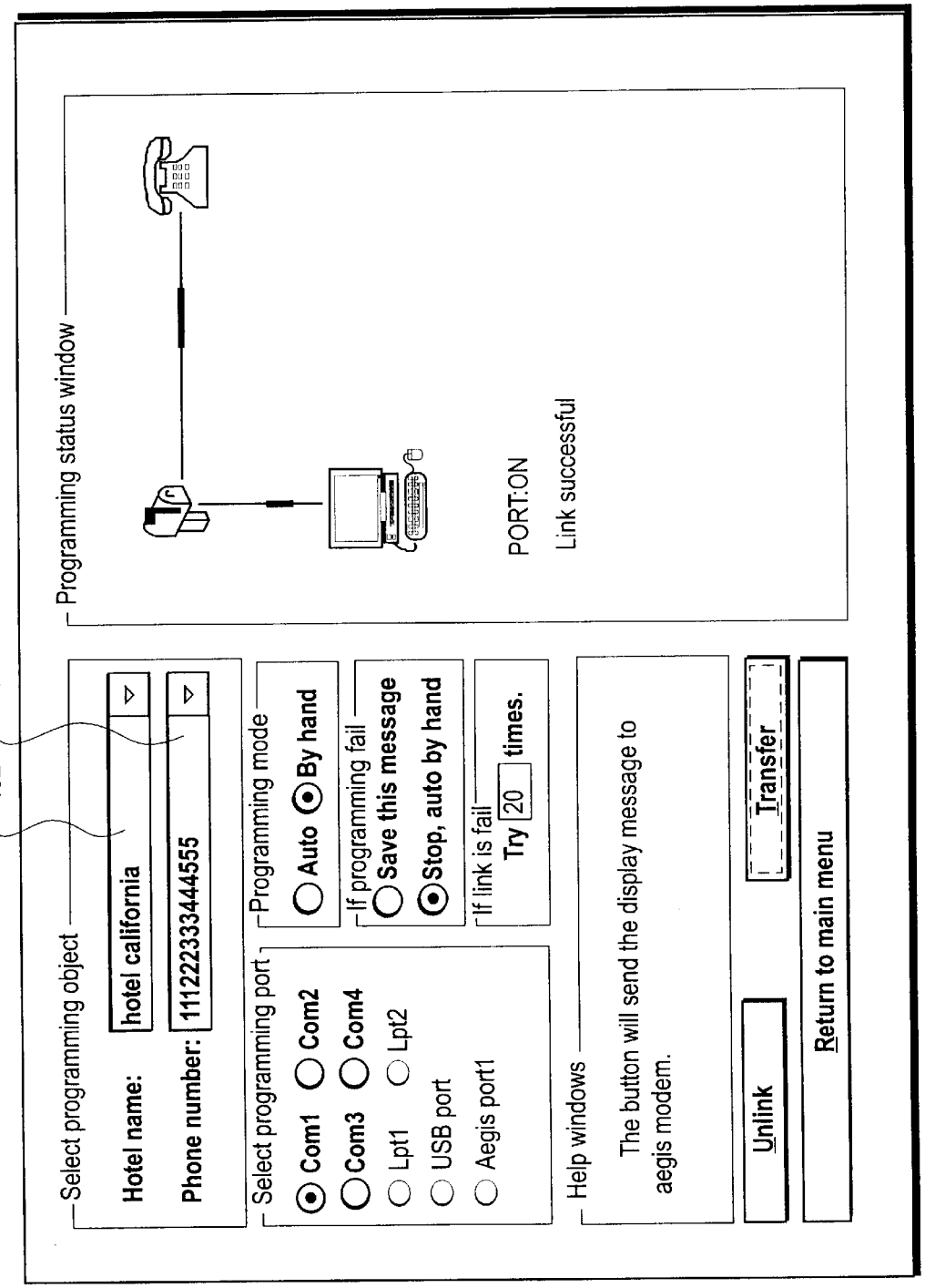
FIGS. 14 and 15 are computer generated screen outputs created by software running on the remote computer.
Figure 15:
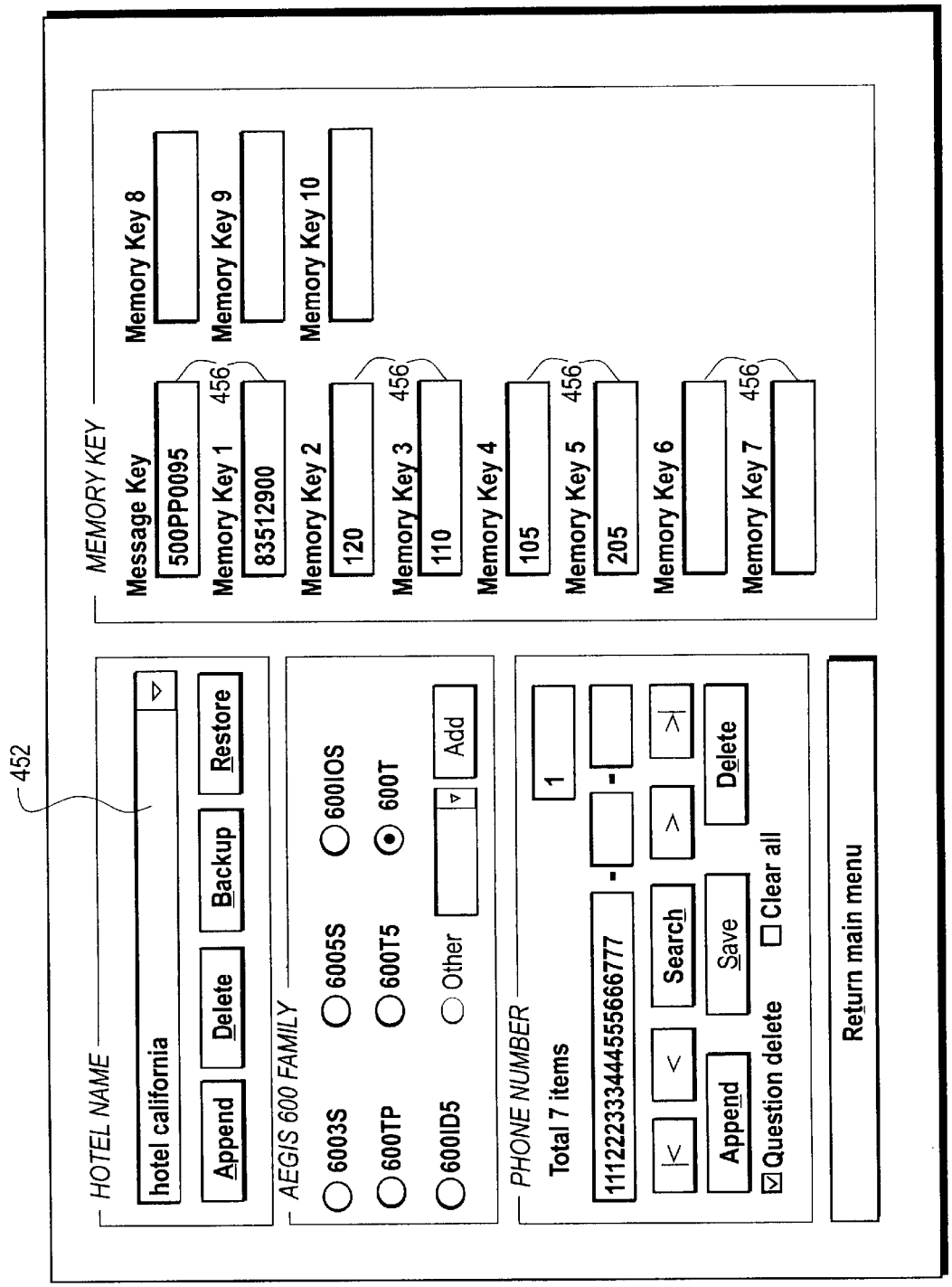

Referring now to FIGS. 14 and 15, these figures are "screen prints" or "screen shots" of screens presented to the user of the remote computer 284 during the remote speed-dial programming operation. Data pertaining to the speed-dial data may be retained in a database or file 450 (FIGS. 10, 11) resident in a hard disc or other storage of the remote computer 284. As shown in FIG. 14, such data may include a hotel name 452 and main telephone number, and extension numbers (not shown) of the plurality of guestroom telephones. Of course, this information would have been entered into the database 450 prior to the programming operation. As shown in FIG. 15, for each extension number of the guestroom telephone 20, there may exist a screen in which to enter the speed-dial service numbers 456 to be programmed into each speed-dial memory key on the guestroom telephone 20 located at that particular extension number.

In operation, after the database 450 has been initially set up, the remote computer 284 may dial the hotel main number 454, and then select a particular guestroom extension number from the list of extension numbers from the database 450. The remote computer 284 then connects to that extension number, programs the guestroom telephone 20 with the remote speed-dial data, and advances to the next extension number stored in the database 450. In this way, all of the guestroom telephones are programmed. Note that the programming for each telephone number or extension in the database 450 may be different, meaning that not every telephone number or extension need be programmed with the same speed-dial data.

Figure 16:
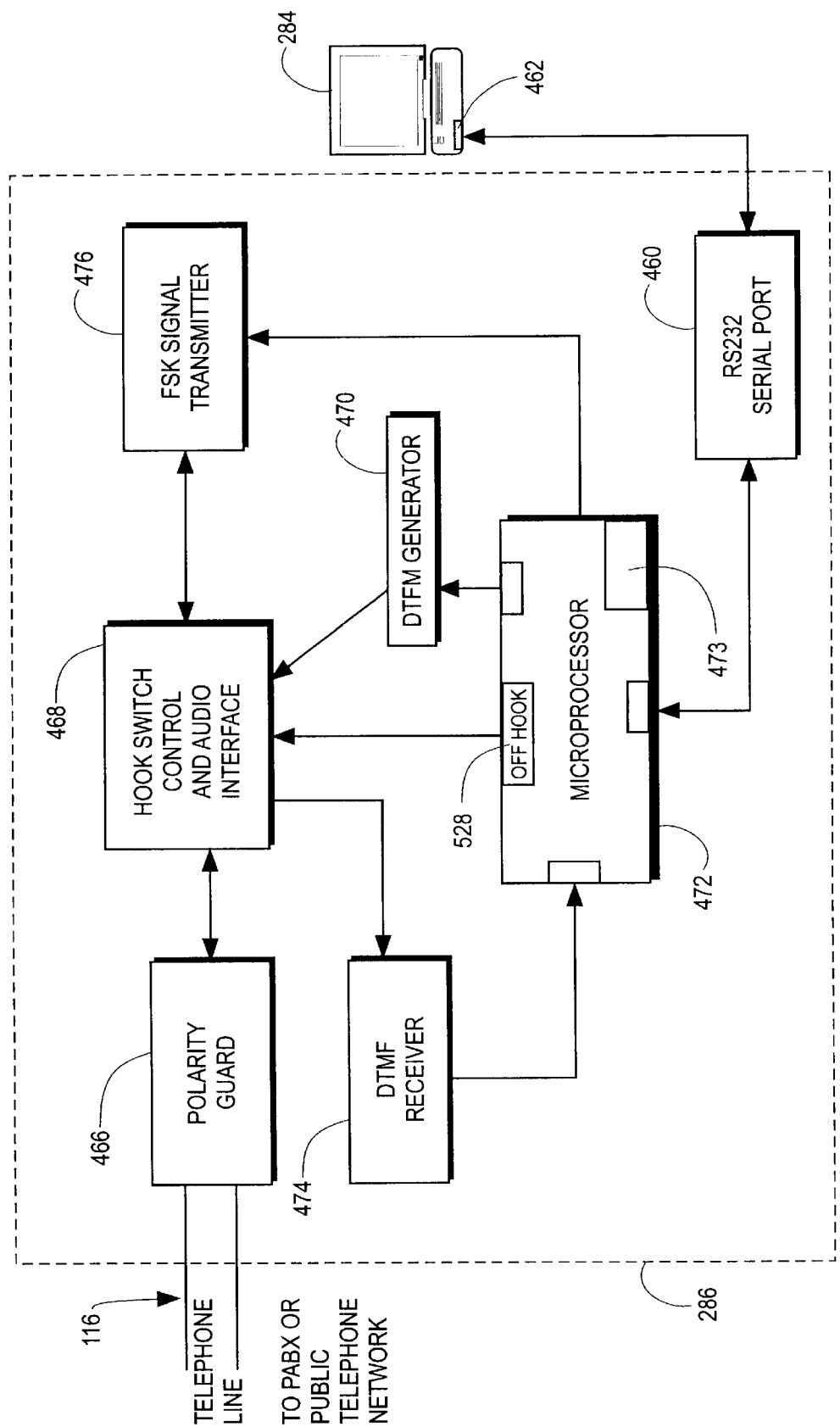
FIG. 16 is a block diagram of a specific embodiment of the remote programming modem shown connected to the remote computer.
Figure 17A:
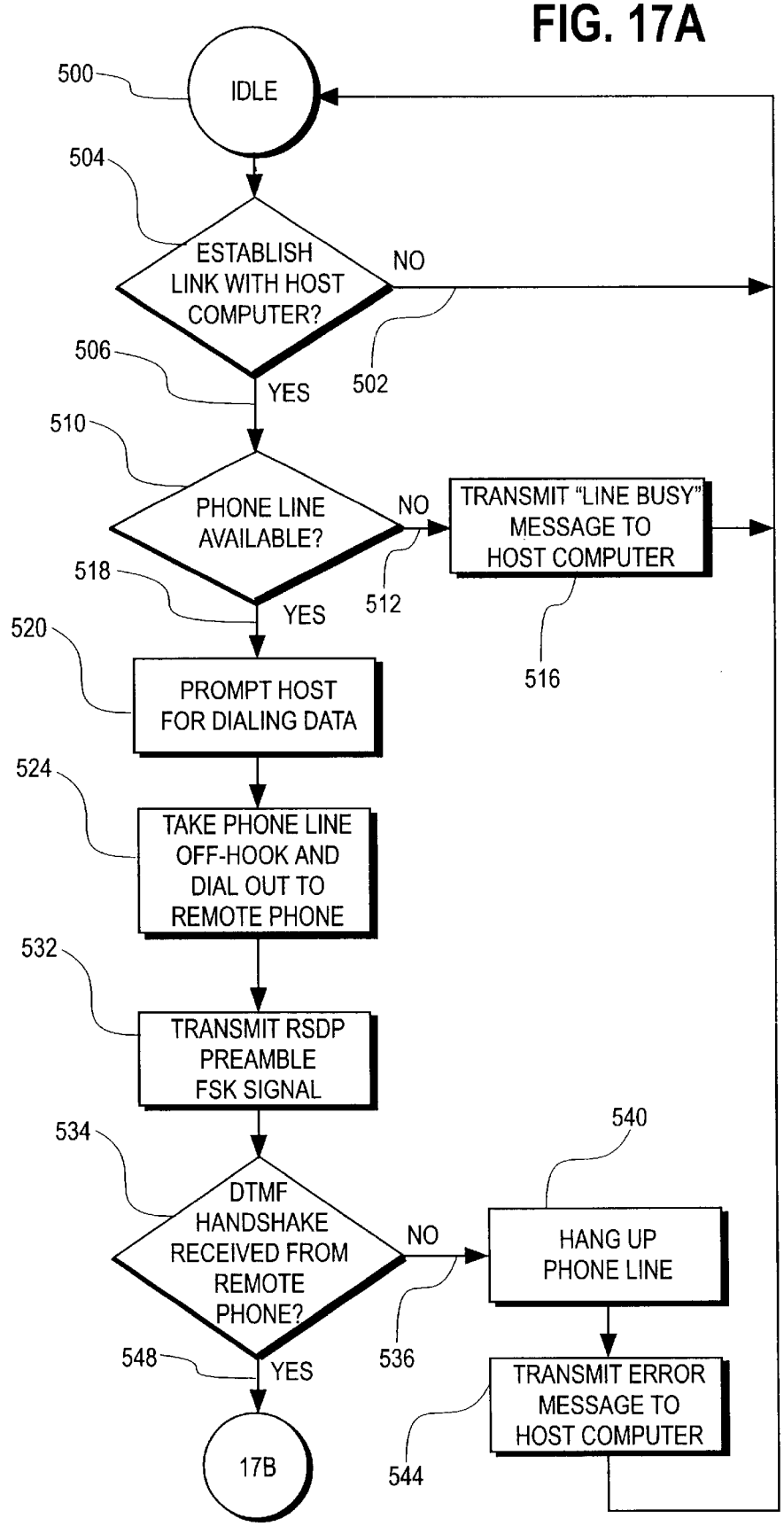
FIGS. 17a and 17b are two sheets of a single flowchart illustrating a specific embodiment of a speed-dial programming sequence, as performed by the remote computer.
Figure 17B:
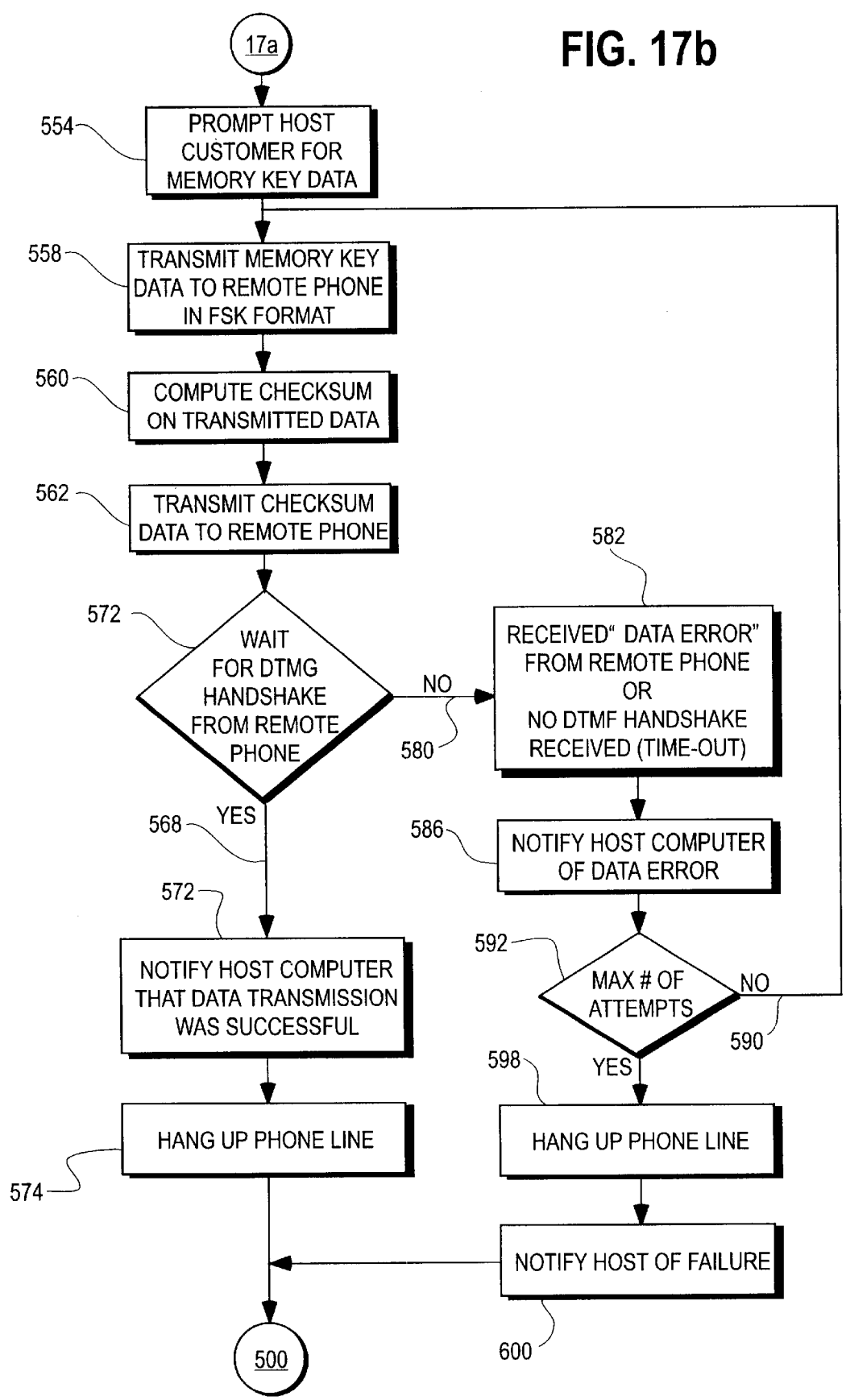

Referring now to FIGS. 16, 17*a* and 17*b*, FIG. 16 is a block diagram of the remote speed-dial programming modem 286, while FIGS. 17*a* and 17*b* illustrate a single flowchart of the steps that may be performed by the remote speed-dial modem 286 to program the guestroom telephone 20. FIGS. 16, 17*a* and 17*b* should be viewed together.

The remote speed-dial programming modem 286 includes a serial port 460, which is connected to a serial port 462 of the remote computer 284. The remote speed-dial programming modem 286 also include a remote polarity guard circuit 466, a remote hook switch control and audio interface circuit 468, a remote DTMF generator 470 and a remote microprocessor circuit 472, with memory 473. The function of these components is similar to the corresponding components described above with reference to FIG. 12, and are given the prefix of "remote" to distinguish them from the components shown in FIG. 12. Also included is a DTMF receiver 474, which receives and processes the DTMF signals sent by the DTMF generator 82 of the guestroom telephone 20 (FIG. 12), and an FSK signal transmitter 476.

The remote speed-dial programming modem 286 is connected to the standard analog telephone line or trunk line 116 through the remote polarity guard 466. The FSK signal transmitter 476 is preferably a 1200 baud FSK modem, which is used in conjunction with the remote DTMF generator 470 to effect remote communication with guestroom telephone 20.

Prior to the programming operation, the software running on the remote microprocessor 472 is in an idle mode, as shown in a step 500, and remains in the idle mode until it can establish communication with the remote computer 284, also referred to as the host computer, as shown in a "no" branch 502 of a step 504. If the remote microprocessor 472 can establish communication with the remote computer 284, as shown in a "yes" branch 506 of the step 504, availability of a telephone line is checked, as shown in a step 510. If a telephone line is not available, as shown in a "no" branch 512 of the step 510, the remote microprocessor 472 sends a message to the remote computer 284 indicating that a telephone line is not yet available, as shown in a step 516.

If a telephone line is available, as shown in a "yes" branch 518 of the step 510, the remote microprocessor 472 obtains the guestroom telephone dialing information from the remote computer 284, as shown in a step 520. The remote microprocessor 284 then places the telephone line in the off-hook condition (a step 524) by outputting a logic high signal to the remote hook switch control and audio interface circuit 468 through an "off-hook" pin 528 of the remote microprocessor 472. This establishes loop current through the telephone line 116. Next, a series of DTMF dialing tones are produced by remote DTMF generator 470 to effect dialing of the telephone number of the guestroom telephone 20, as directed by the remote computer 284.

After a connection is established between the remote speed-dial programming modem 286 and the guestroom telephone 20, a preamble data word is transmitted via the FSK modem to the guestroom telephone 20, as shown in a step 532. The remote microprocessor 472 then waits for the predetermined DTMF tone sequence to be returned back from the guestroom telephone 20 to indicate that the preamble data word was received properly, as shown in a step 534. If the correct DTMF sequence is not received from the guestroom telephone 20 within about one minute, as shown in the "no" branch 536 of the step 534, the remote microprocessor 472 determines that a programming failure has occurred, and terminates the connection, as shown in a step 540.

Such a failure could occur for several reasons, such as if the telephone line was busy, if the guestroom telephone 20 did not answer, or if the call was not answered by the guestroom telephone 20 because the remote programming function was disabled. In any event, the remote microprocessor 472 sends a message to the remote computer 284 via the serial port 460, as shown in a step 544, and the remote computer 284 displays the message on the screen indicating that a programming error has occurred. The remote microprocessor 472 then attempts to re-establishes contact with the remote computer 284 (the step 540) from the idle mode 500, which causes the next telephone number in the list of telephone numbers to be dialed by sending the information to the remote microprocessor.

If the correct DTMF sequence or preamble acknowledgment was received from the guestroom telephone 20, as shown in a "yes" branch 548 of the step 534, the speed-dial programming data is then requested from the remote computer 284 through the serial port 460, as shown in a step 554. The remote computer 284 transmits the speed-dial data to the remote microprocessor 472, which then transmits the speed-dial data over the telephone line via the FSK signal transmitter 476, as shown in a step 558. After all of the FSK speed-dial programming data for this particular guestroom telephone 20 has been transmitted, the remote microprocessor 472 computer computes the final check sum data word (a step 560), and via the FSK modem, transmits (a step 562) the final data checksum data word to the guestroom telephone 20.

The DTMF receiver 474 is then activated, and if the remote microprocessor 472 receives from the guestroom telephone 20 the DTMF tone sequence indicating that programming was successful, as shown in a "yes" branch 568 of a step 572, the remote microprocessor 472 sends a signal back through the serial port 460 to the remote computer 284 indicating that remote programming for the particular guestroom telephone 20 has been successful, as shown by a step 572. The remote microprocessor then terminates the telephone connection, as shown by a step 574. At this point, the remote speed-dial programming modem 286 is ready to receive speed-dial data from the remote computer 284 for the next guestroom telephone 20 to be programmed, as shown by the branch back to the idle mode 500. This continues until all of the telephone numbers or extension numbers contained in the database 450 have been processed by the remote computer 284.

If the not-acknowledge DTMF tone sequence is returned from the guestroom telephone 20 (indicating that the guestroom telephone 20 was not successfully programmed, step 582) within approximately one minute of completion of FSK data transmission (the speed-dial data), as shown by a "no" branch 580 of the step 572, the remote microprocessor 472 transmits a programming failure message to the remote computer 284 (a step 586). If a maximum number of "retries" has not been attempted, as shown by a "no" branch 590 of a step 592, control is passed to the step 558 to retransmit the data.

The remote speed-dial programming modem 286 also checks for reception of a DTMF tone sequence indicating that the FSK data was received by the guestroom telephone 20 but contained a data error. In this case, the remote speed-dial programming modem 286 retransmits the FSK speed-dial data to the guestroom telephone 20, without hanging up or redialing. If the DTMF tone sequence indicating that the programming has been successful has not been received even after three attempts, as shown by a "yes" branch 596 of the step 592, the telephone connection is terminated (a step 598), and the remote microprocessor 472 indicates this failure to the remote computer 284 (a step 600). Control then branches to the idle mode 500. Accordingly, the remote computer 284 then advances to the next guestroom telephone 20 number in the database 450.

Specific embodiments of a method and apparatus for retrieving voice messages according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A telephone system configured to be operatively coupled to a private automatic branch exchange (PABX) system and to a voice mail system, the telephone system permitting a user to retrieve recorded voice messages from the voice mail system, the telephone system comprising:

a telephone;

the telephone having:

a handset;

a message waiting indicator configured to inform the user that the voice message is pending with the voice mail system;

a message retrieval key for retrieving the voice message from the voice mail system; and an audio speaker selected from the group consisting of a loud speaker, piezo-electric element, electrostatic element, tweeter, woofer, horn speaker and moving coil speaker, said audio speaker configured to provide the user with audio output corresponding to the voice message; and wherein a single action by the user of activating the message retrieval key causes the voice message to be retrieved and the audio speaker to be automatically activated such that the voice message is output on the audio speaker without the user lifting the handset.

2. The telephone system according to claim 1 wherein the single action by the user permits retrieval of the voice message without the user lifting the handset and without the user activating the speakerphone key.

3. The telephone system according to claim 1 wherein lifting of the handset while the voice message is output on the audio speaker causes the audio speaker to turn off and the voice message to be played through the handset.

4. The telephone system according to claim 1 wherein the single action of the user of activating the message retrieval key places the telephone in an off-hook condition, turns on the audio speaker, and causes transmission of a predetermined sequence of DTMF tones to the PABX and voice-mail system so as to facilitate retrieval of the voice message.

5. The telephone system according to claim 4 wherein the DTMF signals include at least one of a flash command and a pause command and wherein the DTMF signals are between twelve and sixteen digits in length.

6. The telephone system according to claim 1 wherein activation of the message retrieval key causes the telephone to transmit predetermined signals to the PABX, said transmission of signals causing the PABX to retrieve and transmit the voice message to the telephone.

7. The telephone system according to claim 1 wherein depression of the message retrieval key causes the telephone to transmit a sequence of audio tones to the PABX, said transmission of the audio tones causing the PABX to retrieve and transmit the voice message to the telephone.

8. The telephone system according to claim 1 wherein at least one of the PABX and the voice mail system retrieve and transmit a stored voice mail message to the telephone in response to receiving a predetermined sequence of DTMF signals from the telephone.

9. A telephone system configured to be operatively coupled to a private automatic branch exchange (PABX) system and to a voice mail system, the telephone system permitting a user to retrieve recorded voice messages from the voice mail system, the telephone system comprising:

a telephone;
the telephone having:
a handset;
a message waiting indicator configured to inform the user that the voice message is pending with the voice mail system;
a message retrieval key for retrieving the voice message from the voice mail system, and
an audio speaker selected from the group consisting of a loud speaker, piezo-electric element, electrostatic element, tweeter, woofer, horn speaker and moving coil speaker, the audio speaker configured to provide the user with audio output corresponding to the voice message; and wherein a single action by the user of activating the message retrieval key automatically places the telephone in an off-hook condition, turns on the audio speaker, and causes transmission of a predetermined sequence of DTMF tones to the PABX so as to facilitate retrieval of the voice message from the voice-mail system such that the voice message is output on the audio speaker without the user lifting the handset.

10. The telephone system according to claim 9 wherein the single action by the user permits retrieval of the voice message without the user lifting the handset and without the user activating the speakerphone key.

11. The telephone system according to claim 9 wherein lifting of the handset while the voice message is output on the audio speaker causes the audio speaker to turn off and the voice message to be played through the handset.

12. The telephone system according to claim 9 wherein at least one of the PABX and the voice mail system retrieve and transmit a stored voice mail message to the telephone in response to receiving a predetermined sequence of DTMF signals from the telephone.

13. The telephone system according to claim 9 wherein the DTMF signals include at least one of a flash command and a pause command and wherein the DTMF signals are between twelve and sixteen digits in length.

14. A method of permitting a user to retrieve recorded voice messages from a voice mail system associated with a telephone system, the telephone system configured to be operatively coupled to a private automatic branch exchange (PABX) system and to the voice mail system, the method comprising:

providing a telephone, the telephone having a handset, a message waiting indicator configured to inform the user that the voice message is pending with the voice mail system, a message retrieval key for retrieving the voice message from the voice mail system, and an audio speaker selected from the group consisting of a loud speaker, piezo-electric element, electrostatic element, tweeter, woofer, horn speaker and moving coil speaker, said audio speaker configured to provide the user with audio output corresponding to the voice message; and activating the message retrieval key so that a single action by the user of activating the message retrieval key causes the voice message to be retrieved and the audio speaker to be automatically activated such that the voice message is output on the audio speaker without the user lifting the handset.

15. A method of permitting a user to retrieve recorded voice messages from a voice mail system associated with a telephone system, the telephone system configured to be operatively coupled to a private automatic branch exchange (PABX) system and to the voice mail system, the method comprising:

providing a telephone, the telephone having a handset, a message waiting indicator configured to inform the user that the voice message is pending with the voice mail system, a message retrieval key for retrieving the voice message from the voice mail system, and an audio speaker selected from the group consisting of a loud speaker, piezo-electric element, electrostatic element, tweeter, woofer, horn speaker and moving coil speaker, said audio speaker configured to provide the user with audio output corresponding to the voice message; and activating the message retrieval key so that a single action by the user of activating the message retrieval key automatically places the telephone in an off-hook condition, turns on the audio speaker, and causes transmission of a predetermined sequence of DTMF tones to the PABX to facilitate retrieval of the voice message from the voice-mail system such that the voice message is output on the audio speaker without the user lifting the handset.

* * * * *